United States Patent
Takahashi et al.

(10) Patent No.: US 11,330,496 B2
(45) Date of Patent: May 10, 2022

(54) USER EQUIPMENT AND BASE STATION APPARATUS

(71) Applicant: NTT DOCOMO, INC., Tokyo (JP)

(72) Inventors: Hideaki Takahashi, Tokyo (JP); Hiromasa Umeda, Tokyo (JP); Kei Andou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 16/634,462

(22) PCT Filed: Jul. 23, 2018

(86) PCT No.: PCT/JP2018/027486
§ 371 (c)(1),
(2) Date: Jan. 27, 2020

(87) PCT Pub. No.: WO2019/031212
PCT Pub. Date: Feb. 14, 2019

(65) Prior Publication Data
US 2021/0092662 A1    Mar. 25, 2021

(30) Foreign Application Priority Data
Aug. 10, 2017 (JP) .............................. JP2017-156012

(51) Int. Cl.
*H04W 36/30* (2009.01)
*H04W 36/00* (2009.01)
(Continued)

(52) U.S. Cl.
CPC ............ *H04W 36/30* (2013.01); *H04B 1/525* (2013.01); *H04W 16/32* (2013.01);
(Continued)

(58) Field of Classification Search
None
See application file for complete search history.

(56) References Cited

U.S. PATENT DOCUMENTS

| | | | |
|---|---|---|---|
| 9,161,278 B2 * | 10/2015 | Koo ...................... | H04W 36/20 |
| 2011/0064019 A1 * | 3/2011 | Chun .................... | H04L 5/0058 |
| | | | 370/315 |

(Continued)

FOREIGN PATENT DOCUMENTS

| | | |
|---|---|---|
| JP | 2015-500600 A | 1/2015 |
| JP | 2015-516131 A | 6/2015 |

(Continued)

OTHER PUBLICATIONS

Office Action issued in the counterpart Canadian Patent Application No. 3,066,878, dated Feb. 16, 2021 (4 pages).

(Continued)

*Primary Examiner* — Otis L Thompson, Jr.
(74) *Attorney, Agent, or Firm* — Osha Bergman Watanabe & Burton LLP

(57) ABSTRACT

User equipment communicates with a first base station apparatus included in a first radio communication system and a second base station apparatus included in a second radio communication system, and includes an interference notification generating part that generates an interference notification including information indicating that an device-internal interference at the user equipment is detected or that resolution of device-internal interference is detected; a sending/receiving part that sends the interference notification to the first base station apparatus or the second base station apparatus, and receives a response to the interference notification from the first base station apparatus or the second base station apparatus; and a switching part that switches an uplink transmission scheme based on the response of the interference notification.

4 Claims, 18 Drawing Sheets

(51) Int. Cl.
*H04B 1/525* (2015.01)
*H04W 16/32* (2009.01)
*H04W 36/04* (2009.01)
*H04W 72/08* (2009.01)
*H04W 88/06* (2009.01)

(52) U.S. Cl.
CPC ....... *H04W 36/0085* (2018.08); *H04W 36/04* (2013.01); *H04W 72/082* (2013.01); *H04W 88/06* (2013.01)

(56) References Cited

U.S. PATENT DOCUMENTS

| | | | |
|---|---|---|---|
| 2015/0327280 | A1 | 11/2015 | Zhang et al. |
| 2016/0234852 | A1* | 8/2016 | Ko .................. H04L 5/0005 |
| 2017/0034709 | A1 | 2/2017 | Hapsari et al. |
| 2019/0082337 | A1* | 3/2019 | Gheorghiu ........... H04B 17/318 |
| 2020/0077409 | A1* | 3/2020 | Jiang .................. H04W 16/14 |
| 2020/0119889 | A1* | 4/2020 | Jiang ..................... H04L 1/18 |
| 2020/0127692 | A1* | 4/2020 | Zhang ................ H04W 72/042 |
| 2020/0145175 | A1* | 5/2020 | Hassan Hussein ... H04W 72/10 |
| 2020/0245343 | A1* | 7/2020 | Kim ..................... H02J 50/10 |

FOREIGN PATENT DOCUMENTS

| | | |
|---|---|---|
| JP | 2017-517935 A | 6/2017 |
| WO | 2012/021879 A2 | 2/2012 |
| WO | 2013/085256 A1 | 6/2013 |
| WO | 2015/156324 A1 | 10/2015 |
| WO | 2016/095078 A1 | 6/2016 |

OTHER PUBLICATIONS

Office Action issued in the counterpart Japanese Patent Application No. 2019-535077, dated Oct. 27, 2020 (7 pages).
International Search Report issued in PCT/JP2018/027486 dated Oct. 2, 2018 (5 pages).
Written Opinion of the International Searching Authority issued in PCT/JP2018/027486 dated Oct. 2, 2018 (5 pages).
3GPP TR 36.804 V14.0.0; "3rd Generation Partnership Project; Technical Specification Group Radio Access Network; Study on New Radio Access Technology; Radio Interface Protocol Aspects (Release 14)"; Mar. 2017 (57 pages).
3GPP TS 37.340 V0.1.1; "3rd Generation Partnership Project; Technical Specification Group Radio Access Network; Evolved Universal Terrestrial Radio Access (E-UTRA) and NR; Multi-connectivity; Stage 2 (Release 15)"; Jun. 2017 (30 pages).
Extended European Search Report in counterpart European Application No. 18844341.0 dated Apr. 6, 2021 (10 pages).
NTT DOCOMO, Inc.; "IDC support for IMD and harmonics due to uplink transmission in MR-DC"; 3GPP TSG-RAN WG2 NR Ad-hoc #2, R2-1706453; Qingdao, China; Jun. 27-29, 2017 (2 pages).
Notice of Reasons for Refusal issued in Japanese Application No. 2019-535077, dated Jan. 26, 2021 (7 pages).

* cited by examiner

FIG.12

InDeviceCoexIndication message

```
-- ASN1START

InDeviceCoexIndication-v1310-IEs ::=      SEQUENCE {
    affectedCarrierFreqList-v1310         AffectedCarrierFreqList-v1310         OPTIONAL,
    affectedCarrierFreqCombList-r13       AffectedCarrierFreqCombList-r13       OPTIONAL,
    nonCriticalExtension                  InDeviceCoexIndication-v15xy-IEs      OPTIONAL
}

InDeviceCoexIndication-v15xy-IEs ::=      SEQUENCE {
    mr-DC-AssistanceInfo-r15              SEQUENCE {
        affectedCarrierFreqCombList-r15   AffectedCarrierFreqCombList-r11       OPTIONAL,
        powerHeadroom-r15                 PowerHeadroom-r15                     OPTIONAL,
        victimCarrierList-r15             VictimCarrierList-r15                 OPTIONAL,
    }
    nonCriticalExtension                  SEQUENCE {}                           OPTIONAL
}

-- ASN1STOP
```

FIG.13

OtherConfig information element

```
-- ASN1START

IDC-Config-r11 ::=              SEQUENCE {
    idc-Indication-r11              ENUMERATED {setup}       OPTIONAL,       -- Need OR
    autonomousDenialParameters-r11  SEQUENCE {
        autonomousDenialSubframes-r11   ENUMERATED {n2, n5, n10, n15,
                                                   n20, n30, spare2, spare1},
        autonomousDenialValidity-r11    ENUMERATED {
                                            sf200, sf500, sf1000, sf2000,
                                            spare4, spare3, spare2, spare1}
    }                               OPTIONAL,       -- Need OR
    ...,
    [[ idc-Indication-UL-CA-r11     ENUMERATED {setup}       OPTIONAL        -- Cond idc-Ind
    ]],
    [[ idc-Indication-MR-DC-r15     ENUMERATED {setup}       OPTIONAL        -- Cond idc-Ind
    ]]
}

-- ASN1STOP
```

*idc-Indication-MR-DC*
The field is used to indicate whether the UE is configured to provide IDC indications for Multi-RAT Dual Connectivity using the *InDeviceCoexIndication* message.

FIG.14

InDeviceCoexIndication message

```
-- ASN1START

InDeviceCoexIndication-r15    SEQUENCE {
    criticalExtensions            CHOICE {
        c1                            CHOICE {
            inDeviceCoexIndication-r15    InDeviceCoexIndication-r15-IEs,
            spare3 NULL, spare2 NULL, spare1 NULL
        },
        criticalExtensionsFuture      SEQUENCE {}
    }
}

InDeviceCoexIndication-r11-IEs ::= SEQUENCE {
    affectedCarrierFreqList-r15       AffectedCarrierFreqList-r15
    tdm-AssistanceInfo-r15            TDM-AssistanceInfo-r15                              OPTIONAL,
    ul-CA-AssistanceInfo-r15          SEQUENCE {                                          OPTIONAL,
        affectedCarrierFreqCombList-r11 AffectedCarrierFreqCombList-r15     OPTIONAL,
        victimSystemType-r15            VictimSystemType-r15
    }                                                                                     OPTIONAL,
    mr-DC-AssistanceInfo-r15          SEQUENCE {
        affectedCarrierFreqCombListNR-r15 AffectedCarrierFreqCombListNR-r15               OPTIONAL,
        powerHeadroom-r15                 PowerHeadroom-r15                               OPTIONAL,
        victimCarrierListNR-r15           VictimCarrierListNR-r15                         OPTIONAL
    }
    lateNonCriticalExtension          OCTET STRING                          OPTIONAL,
    nonCriticalExtension              SEQUENCE {}
}

-- ASN1STOP
```

FIG.15

OtherConfig information element

```
-- ASN1START

IDC-Config-r11 ::=            SEQUENCE {
    idc-Indication-r11            ENUMERATED {setup}        OPTIONAL,    -- Need OR
    autonomousDenialParameters-r11    SEQUENCE {
        autonomousDenialSubframes-r11     ENUMERATED {n2, n5, n10, n15,
                                                     n20, n30, spare2, sparel},
        autonomousDenialValidity-r11      ENUMERATED {
                                              sf200, sf500, sf1000, sf2000,
                                              spare4, spare3, spare2, sparel}
    }                             OPTIONAL,      -- Need OR
    ...,
    [[ idc-Indication-UL-CA-r11        ENUMERATED {setup}        OPTIONAL    -- Cond idc-Ind
    ]],
    [[ idc-Indication-MR-DC-r15        ENUMERATED {setup}        OPTIONAL    -- Cond idc-Ind
    ]]
}

-- ASN1STOP
```

FIG.16

InDeviceCoexIndication message

```
-- ASN1START

InDeviceCoexIndication-v1310-IEs ::=    SEQUENCE {
    affectedCarrierFreqList-v1310        AffectedCarrierFreqList-v1310           OPTIONAL,
    affectedCarrierFreqCombList-r13      AffectedCarrierFreqCombList-r13         OPTIONAL,
    nonCriticalExtension                 InDeviceCoexIndication-v15xy-IEs        OPTIONAL
}

InDeviceCoexIndication-v15xy-IEs ::=    SEQUENCE {
    mr-DC-AssistanceInfo-r15             SEQUENCE {
        affectedCarrierFreqCombListEUTRA-r15  AffectedCarrierFreqCombListEUTRA-r15    OPTIONAL,
        powerHeadroom-r15                     PowerHeadroom-r15                       OPTIONAL,
        victimCarrierListEUTRA-r15            VictimCarrierListEUTRA-r15              OPTIONAL,
        nr-InDeviceCoexInd-Container-r15      OCTET STRING                            OPTIONAL
    },
    nonCriticalExtension                 SEQUENCE {}                                  OPTIONAL
}

-- ASN1STOP
```

FIG.17

InDeviceCoexIndication message

```
-- ASN1START

InDeviceCoexIndication-r15 ::=     SEQUENCE {
    criticalExtensions                 CHOICE {
        c1                                 CHOICE {
            inDeviceCoexIndication-r15         InDeviceCoexIndication-r15-IEs,
            spare3 NULL, spare2 NULL, spare1 NULL
        },
        criticalExtensionsFuture           SEQUENCE {}
    }
}

InDeviceCoexIndication-r11-IEs ::= SEQUENCE {
    affectedCarrierFreqList-r15        AffectedCarrierFreqList-r15
    tdm-AssistanceInfo-r15             TDM-AssistanceInfo-r15                                     OPTIONAL,
    ul-CA-AssistanceInfo-r15           SEQUENCE {                                                 OPTIONAL,
        affectedCarrierFreqCombList-r11    AffectedCarrierFreqCombList-r15                            OPTIONAL,
        victimSystemType-r15               VictimSystemType-r15
    }                                                                                             OPTIONAL,
    mr-DC-AssistanceInfo-r15           SEQUENCE {
        affectedCarrierFreqCombListNR-r15  AffectedCarrierFreqCombListNR-r15                          OPTIONAL,
        powerHeadroom-r15                  PowerHeadroom-r15                                          OPTIONAL,
        victimCarrierListNR-r15            VictimCarrierListNR-r15                                    OPTIONAL,
        eutra-InDeviceCoexInd-Container-r15 OCTET STRING                                              OPTIONAL
    }
    lateNonCriticalExtension           OCTET STRING                                               OPTIONAL,
    nonCriticalExtension               SEQUENCE {}                     OPTIONAL
}

-- ASN1STOP
```

USER EQUIPMENT AND BASE STATION APPARATUS

TECHNICAL FIELD

The present invention relates to user equipment and a base station apparatus in a radio communication system.

BACKGROUND ART

Currently, in 3GPP (Third Generation Partnership Project), specification of a new radio communication system called NR (New Radio Access Technology) system is being developed as a successor to the LTE (Long Term Evolution) system and the LTE-Advanced system.

In the NR system, similar to dual connectivity in the LTE system, introduction of an LTE-NR dual connectivity has been studied, in which data are divided between a base station apparatus (eNB) of the LTE system and a base station apparatus (gNB) of the NR system, and data are transmitted and received simultaneously by these base station apparatuses.

PRIOR ART DOCUMENT

Non-Patent Document

Non-Patent Document 1: 3GPP TR 38.804 V14.0.0 (2017 March)
Non-Patent Document 2: 3GPP TS 37.340 V0.1.1 (2017 June)

SUMMARY OF THE INVENTION

Problem to be Solved by the Invention

In LTE-NR dual connectivity, intermodulation distortion (InterModulation Distortion: IMD) and a higher harmonic may occur in two or more uplink transmissions. In this case, the generated IMD and the higher harmonic may fall into a downlink reception band of an LTE component carrier or a NR component carrier in user equipment (User Equipment: UE) and may cause interference (in-device interference) in the user equipment. In particular, because the NR system uses a wide bandwidth such as the 28 GHz band, it is susceptible to IMD.

Furthermore, not only in the dual connectivity between the LTE system and the NR system, but also in dual connectivity between a plurality of radio communication systems to which respective different RATS are applied, IMD, a higher harmonic wave, etc., due to two or more uplink transmissions may fall into a reception band and may cause in-device interference.

In view of the above-described problems, an object of the present invention is to provide a technique for suppressing the in-device interference in the dual connectivity among a plurality of radio communication systems using different RATS.

Means for Solving the Problem

In order to solve the above problem, an aspect of the present invention relates to user equipment for communicating with a first base station apparatus included in a first radio communication system and a second base station apparatus included in a second radio communication system, the user equipment including an interference notification generating part that generates an interference indication including information indicating that an in-device interference at the user equipment is detected or that resolution of in-device interference is detected; a sending/receiving part that sends the interference indication to the first base station apparatus or the second base station apparatus, and receives a response to the interference indication from the first base station apparatus or the second base station apparatus; and a switching part that switches an uplink transmission scheme based on the response of the interference indication.

Advantage of the Invention

According to the present invention, it is possible to suppress in-device interference in a dual connectivity among a plurality of radio communication systems using different RATs.

BRIEF DESCRIPTION OF DRAWINGS

FIG. 12 is a diagram illustrating a signaling example of an LTE side in one example of the present invention.

FIG. 13 is a diagram illustrating a signaling example of the LTE side in one example of the present invention.

FIG. 14 is a diagram illustrating a signaling example of an NR side in one example of the present invention.

FIG. 15 is a diagram illustrating a signaling example of the NR side in one example of the present invention.

FIG. 16 is a diagram illustrating a signaling example of the LTE side in one example of the present invention.

FIG. 17 is a diagram illustrating a signaling example of the NR side in one example of the present invention.

EMBODIMENTS OF THE INVENTION

Hereinafter, exemplary embodiments of the present invention are described on the basis of drawings.

In the following embodiments, user equipment is disclosed that supports dual connectivity between a plurality of radio communication systems using different RATs, that is, multi-RAT dual connectivity.

Figure 1:
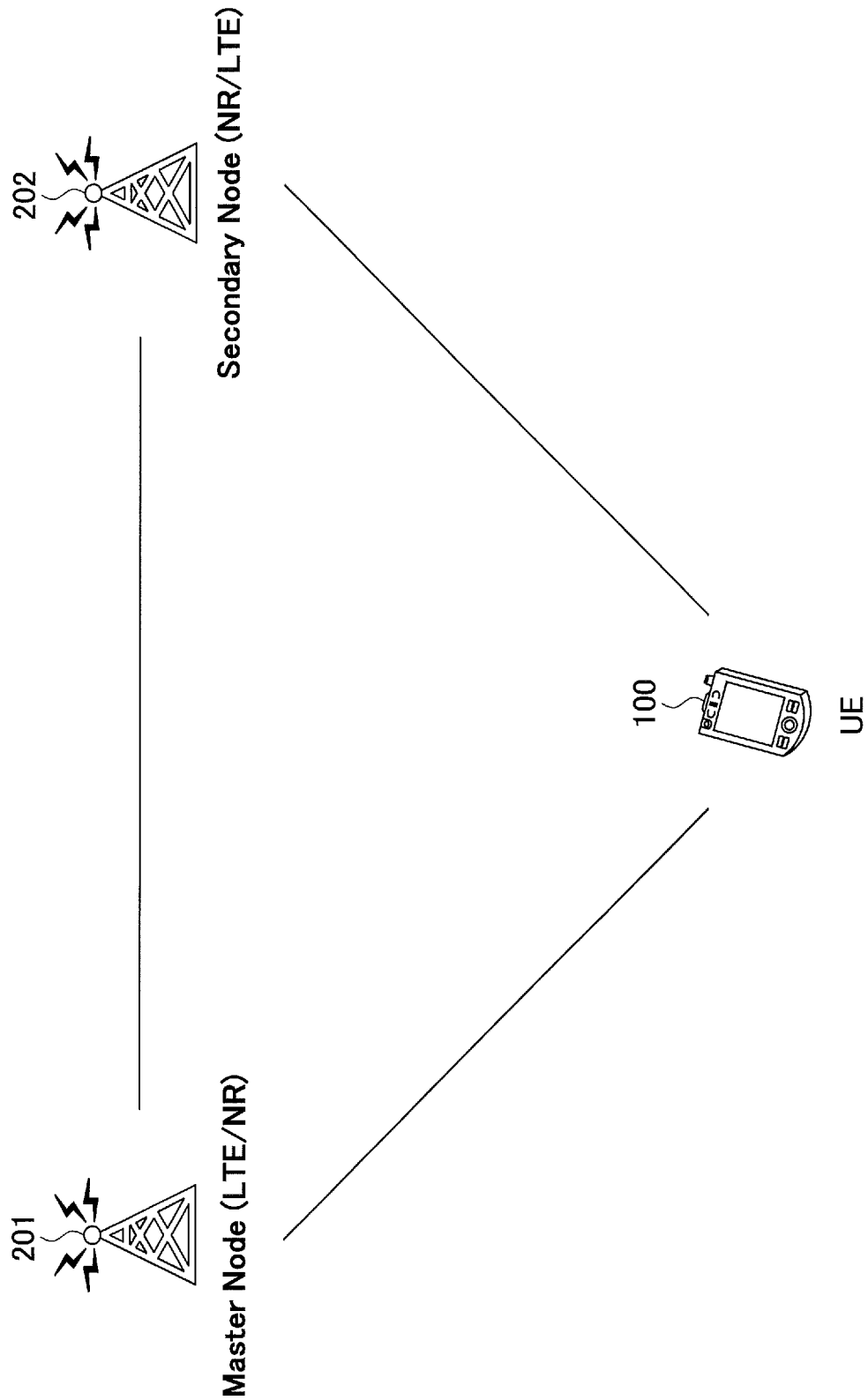
FIG. 1 is a schematic diagram illustrating a radio communication system according to one embodiment of the present invention.

A radio communication system according to one embodiment of the present invention is described with reference to FIG. 1. FIG. 1 is a schematic diagram illustrating a radio communication system according to the embodiment of the present invention.

As illustrated in FIG. 1, user equipment 100 communicates with base stations 201 and 202 (if not distinguished thereafter, they may be referred to as base stations 200) provided by an LTE system and an NR system, and supports an LTE-NR dual connectivity with the base station 201 as a master base station and the base station 202 as a secondary base station. That is, the user equipment 100 can simultaneously send to or receive from the master base station 201 and the secondary base station 202 by simultaneously using the plurality of component carriers provided by the master base station 201 and the secondary base station 202. In the illustrated embodiment, each of the LTE system and the NR system has only one base station; however, in general, a large number of base stations are arranged so as to cover service areas of the LTE system and the NR system.

Although the following embodiments are described with respect to the LTE-NR dual connectivity, the user equipment according to the present disclosure is not limited thereto; and those skilled in the art will readily appreciate that the present invention is applicable to the dual connectivity among a plurality of radio communication systems using different RATS, that is, multi-RAT dual connectivity.

Figure 2:
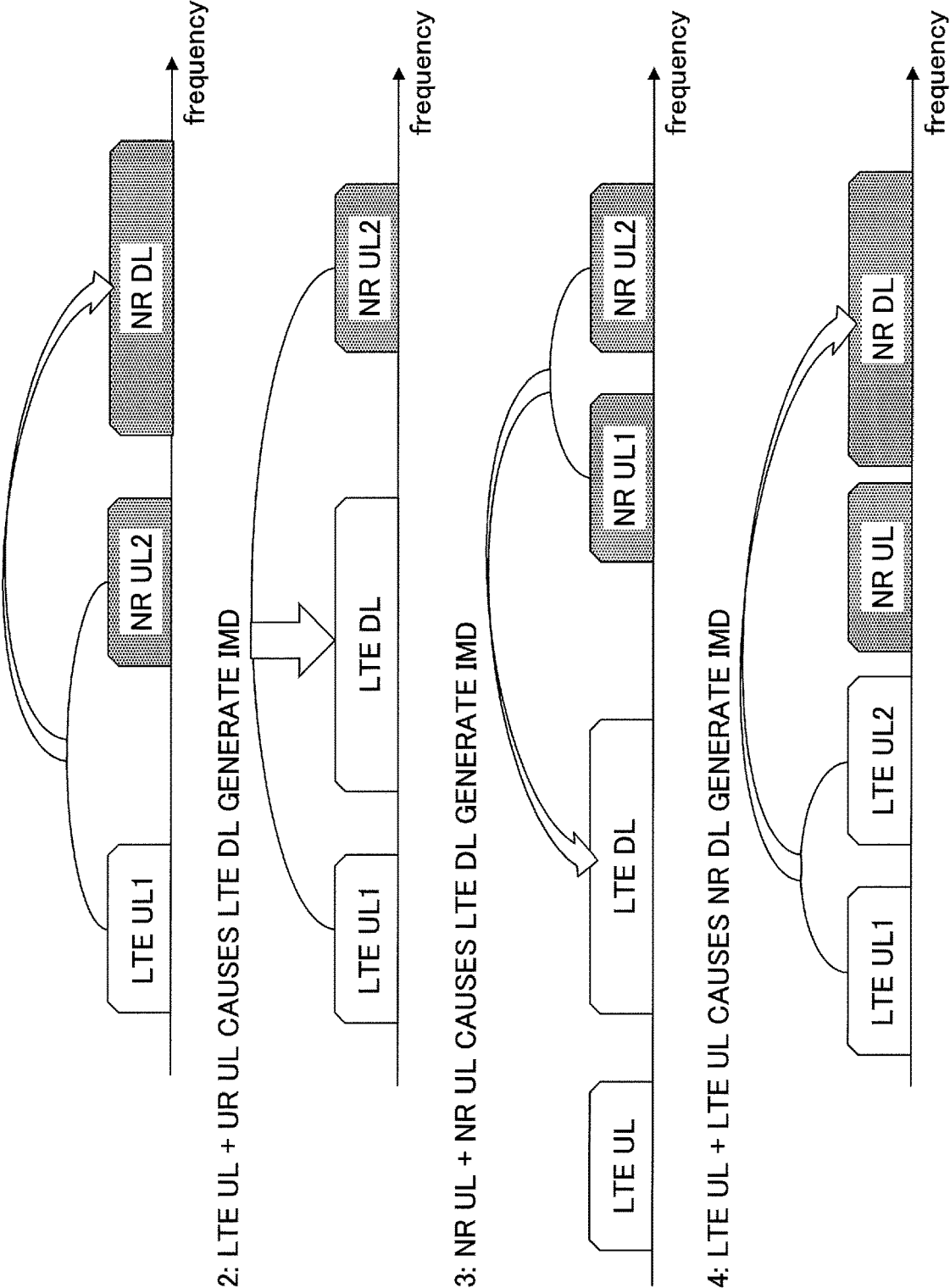
FIG. 2 is a diagram illustrating combinations of intermodulation distortion (IMD) in an LTE-NR dual connectivity.

In the embodiment described below, in-device interference caused by intermodulation distortion (IMD), higher harmonic wave, and the like in dual connectivity (LTE-NR dual connectivity) between the LTE system and the NR system is described. In LTE-NR dual connectivity, there are four typical cases where the in-device interference occurs as depicted in FIG. 2.

In Case 1, in the uplink dual connectivity (LTE UL1+NR UL2) between the uplink carrier (LTE UL1) of the LTE system and the uplink carrier (NR UL2) of the NR system, intermodulation distortion due to a combination of LTE UL 1 and NR UL 2 and/or a higher harmonic due to transmission of LTE UL1 or NR UL2 falls into the downlink carrier (NR DL) of the NR system and causes device-internal interference in the NR DL.

In Case 2, in the uplink dual connectivity (LTE UL1+NR UL2) between the uplink carrier (LTE UL1) of the LTE system and the uplink carrier (NR UL2) of the NR system, intermodulation distortion due to the combination of LTE UL1 and NR UL2 and/or higher harmonics due to transmission of LTE UL1 or NR UL2 falls into the downlink carrier (LTE DL) of the LTE system and causes device-internal interference in the LTE DL.

In Case 3, in the uplink dual connectivity (LTE UL+NR UL1+NR UL2) between the uplink carrier (LTE UL) of the LTE system and the two uplink carriers (NR UL1, NR UL2) of the NR system, intermodulation distortion due to the combination of NR UL1 and NR UL2 and/or higher harmonics due to transmission of NR UL1 or NR UL2 falls into the downlink carrier (LTE DL) of the LTE system and causes device-internal interference in the LTE DL.

In Case 4, in the uplink dual connectivity (LTE UL1+LTE UL2+NR UL) between the two uplink carriers (LTE UL1, LTE UL2) of the LTE system and the uplink carrier (NR UL) of the NR system, intermodulation distortion due to the combination of LTE UL1 and LTE UL2 and/or higher harmonic due to transmission of LTE UL1 or LTE UL2 falls into the downlink carrier (NR DL) of the NR system and causes device-internal interference in the NR DL.

In order to suppress the device-internal interference caused by the intermodulation distortion, the higher harmonic wave, and the like in the above-mentioned LTE-NR dual connectivity, the user equipment according to the present disclosure sends to a base station an interference notification including interfered carrier information indicating a downlink serving carrier that is subject to interference by intermodulation distortion, the higher harmonic wave, or the like. Upon receiving an interference notification, the base station specifies a combination of uplink serving carriers causing the device-internal interference in the carrier indicated by the interfered carrier information, and can execute the interference suppression control on the user equipment, such as continuing the uplink dual connectivity by a combination of carriers that do not cause interference to a carrier subjected to be interfered.

Figure 3:
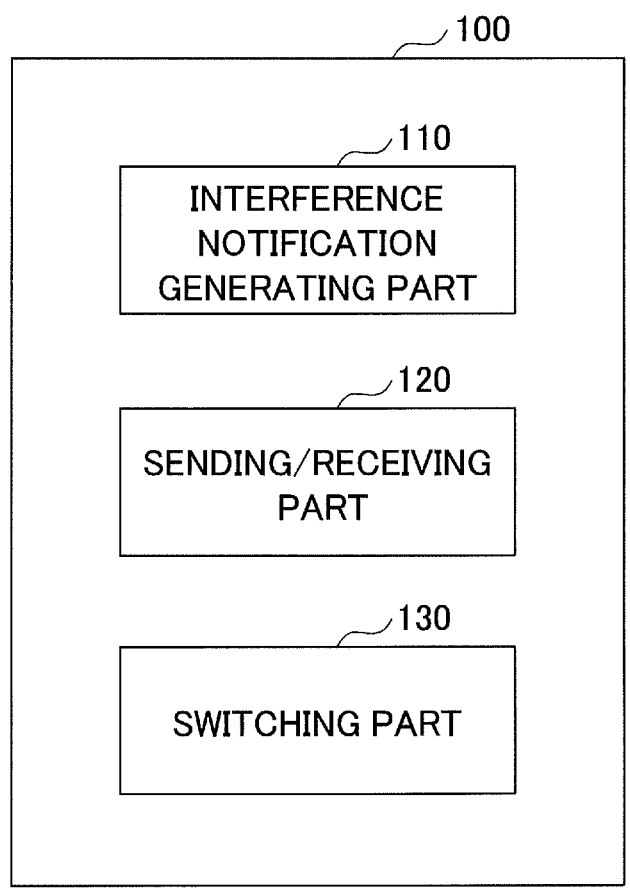
FIG. 3 is a block diagram illustrating a functional configuration of user equipment in one embodiment of the present invention.

Next, with reference to FIG. 3, the user equipment according to the embodiment of the present invention is described. FIG. 3 is a block diagram illustrating a functional configuration of the user equipment according to the embodiment of the present invention.

As illustrated in FIG. 3, the user equipment 100 includes an interference notification generating part 110, a sending/receiving part 120, and a switching part 130.

The interference notification generating part 110 generates an interference notification including the interfered carrier information indicating a serving carrier receiving device-internal interference in the dual connectivity between a first radio communication system and a second radio communication system. Specifically, in the LTE-NR dual connectivity between the LTE system and the NR system, when detecting that the intermodulation distortion, the higher harmonic wave, or the like generated by a combination (for example, LTE UL+NR UL, LTE UL1+LTE UL2, NR UL1+NR UL2, or the like in the embodiment depicted in FIG. 2) of uplink component carriers causes interference (that is, device-internal interference) with a downlink component carrier in the user equipment 100, the interference notification generating part 110 generates an interference notification ("InDeviceCoexIndication") including the interfered carrier information indicating the downlink component carrier being under interference.

The sending/receiving part 120 sends the generated interference notification to the base station 201 or 202. Specifically, when the sending/receiving part 120 receives an interference report configuration ("Idc-Indication-MR-DC" in "OtherConfig") for causing the user equipment 100 to report the interference notification indicating an interfered carrier and/or an interfering carrier caused by the device-internal interference, the interference notification generating part 110 starts detection of the device-internal interference caused by the intermodulation distortion, the higher harmonic wave, or the like due to the combination of uplink component carriers, and generates the interference notification including the interfered carrier information upon detecting the device-internal interference due to the combination of the uplink component carriers. Then, when the sending/receiving part 120 sends the generated interference notification to the base station 201 or 202, the base station 201 or 202 specifies an interfered carrier and a combination of uplink component carriers causing the device-internal interference in the interfered carrier, based on the interfered carrier information in the received interference notification.

In this case, for example, the base station 201 or 202 may previously hold association information indicating a pair of the combination of the uplink component carriers and a downlink component carrier causing the device-internal interference due to the combination. The base station 201 or 202 specifies the uplink component carriers corresponding to the interfered carrier reported from the user equipment 100 as the interfering carriers, by referring to the association information, and may execute the interference suppression control with respect to the user equipment 100. For example, the base station 201 or 202 may continue the uplink dual connectivity by reallocating a frequency domain or a component carrier, which does not fall into the interfered carrier, for which the device-internal interference has been reported, or may deactivate (deactivation) or deconfigurate (deconfiguration) a secondary cell in the uplink dual connectivity. Alternatively, the base station 201 or 202 may reconfigure a primary cell and/or a secondary cell having different frequencies.

Thereafter, when the device-internal interference in the user equipment 100 is eliminated, for example, the interference notification generating part 110 generates an empty interference notification, and the sending/receiving part 120 sends the interference notification to the base station 201 or 202. Upon receiving the empty interference notification, the base station 201 or 202 can determine that the device-internal interference in the user equipment 100 has been eliminated.

The switching part 130 switches between UL transmission schemes based on information sent from the base station 201 or 202. The UL transmission schemes include a single UL transmission alternating between LTE and NR in a time-switched manner (time-switched), a multiple UL carrier simultaneous transmission of LTE and NR, and the like.

In one embodiment, the interfered carrier information may include cell identification information of a serving carrier subject to interference. For example, the cell identification information may be a serving cell index of an interfered serving carrier. Alternatively, the cell identification information may be a measurement object indicating information necessary for the user equipment 100 to measure the carrier, a center frequency of the carrier, any information specifying the center frequency (for example, EARFCN (E-UTRA Absolute Radio Frequency Channel Number) or the like in the LTE system), or the like. For example, the base station 201 or 202 ascertains in advance the center frequency and a bandwidth of each serving cell or each measurement object, and specifies the center frequency and bandwidth of the serving cell or the measurement object indicated by the received cell identification information. The base station 201 or 202 can specify the combination of uplink component carriers that causes device-internal interference in the interfered component carrier based on the specified center frequency and bandwidth. According to the present embodiment, the base station 201 or 202 can specify the interfering carrier from the interfered carrier information, without the sending of interfering carrier information by the user equipment 100.

Moreover, in one embodiment, the interfered carrier information may include a specific physical resource block (PRB), a physical resource element (PRE), and the like in the interfered carrier. That is, the interference notification generating part 110 can indicate an interfered frequency area with finer granularity than the interfered carrier, and the base station 201 or 202, which has received the interfered carrier information, can execute more appropriate interference suppression control.

Also, in one embodiment, the interference notification may further include interfering carrier information indicating a serving carrier causing interference. That is, the interference notification generating part 110 may further include interfering carrier information indicating a combination of serving carriers giving the interference in the interference notification. More specifically, the interfering carrier information indicates the combination of the uplink component carriers causing the device-internal interference, and may be, for example, a measurement object of each uplink component carrier, the center frequency, any information specifying the center frequency (for example, EARFCN in the LTE system, or the like), or the like.

Moreover, in one embodiment, the interference notification may further include information indicating a switching of the UL transmission scheme. In the user equipment 100, when device-internal interference is detected, the sending/receiving part 120 sends the interference notification generated by the interference notification generating part 110 to the base station 201 or 202. Information indicating switching to single UL transmission for alternating LTE and NR (time-switched), may be included in the interference notification. Upon receiving the interference notification, the base station 201 or 202 switches to the single UL transmission for time-switching LTE or NR. The base station 201 or 202 has a generating part for generating a message to control switching and a communication part for sending and receiving a message relating to the switching. Upon receiving the message relating to the switching from the base station 201 or 202, the user equipment 100 switches the UL transmission scheme with the switching part 130.

Thereafter, when the device-internal interference in the user equipment 100 is eliminated, for example, the interference notification generating part 110 generates an empty interference notification, and the sending/receiving part 120 sends the interference notification to the base station 201 or 202. Upon receiving the empty interference notification, the base station 201 or 202 determines that the device-internal interference in the user equipment 100 has been eliminated, and can switch to the multiple UL carrier simultaneous transmission of LTE and NR. When the device-internal interference in the user equipment 100 is eliminated, for example, the interference notification generating part 110 may generate an interference notification including an indication to switch to the multiple UL carriers simultaneous transmission of LTE and NR, and the sending/receiving part 120 may send the interference notification to the base station 201 or 202. Upon receiving the interference notification, the base station 201 or 202 determines that the device-internal interference in the user equipment 100 has been eliminated and can switch to the multiple UL carrier simultaneous transmission of LTE and NR. The base station 201 or 202 has a generating part for generating a message to control the switching and a communication part for sending and receiving a message relating to the switching. Upon receiving the message relating to the switching from the base station 201 or 202, the user equipment 100 switches the UL transmission scheme with the switching part 130.

Figure 4:
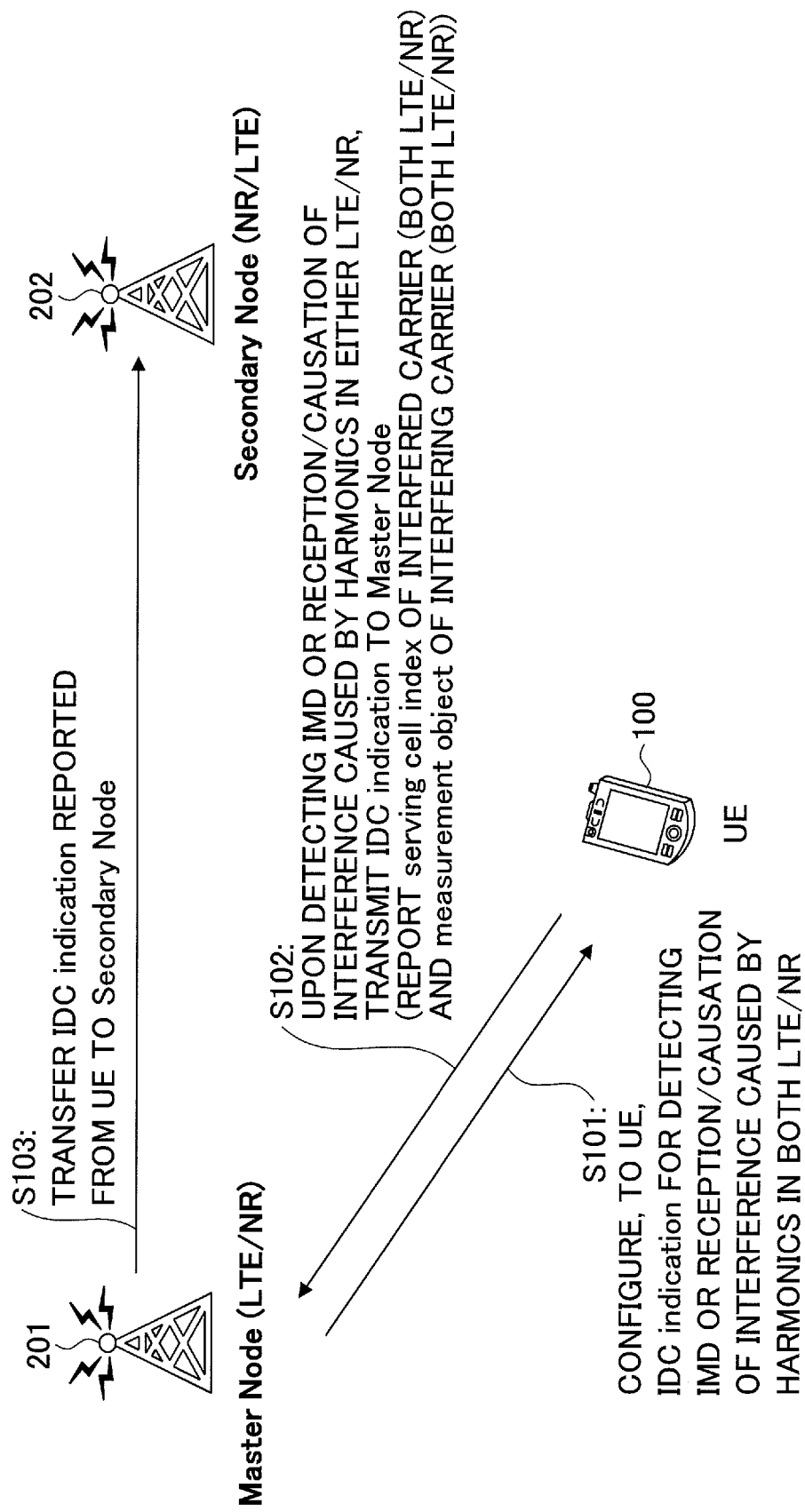
FIG. 4 is a schematic diagram illustrating an IDC indication configuring procedure in the LTE-NR dual connectivity according to one embodiment of the present invention.
Figure 5:
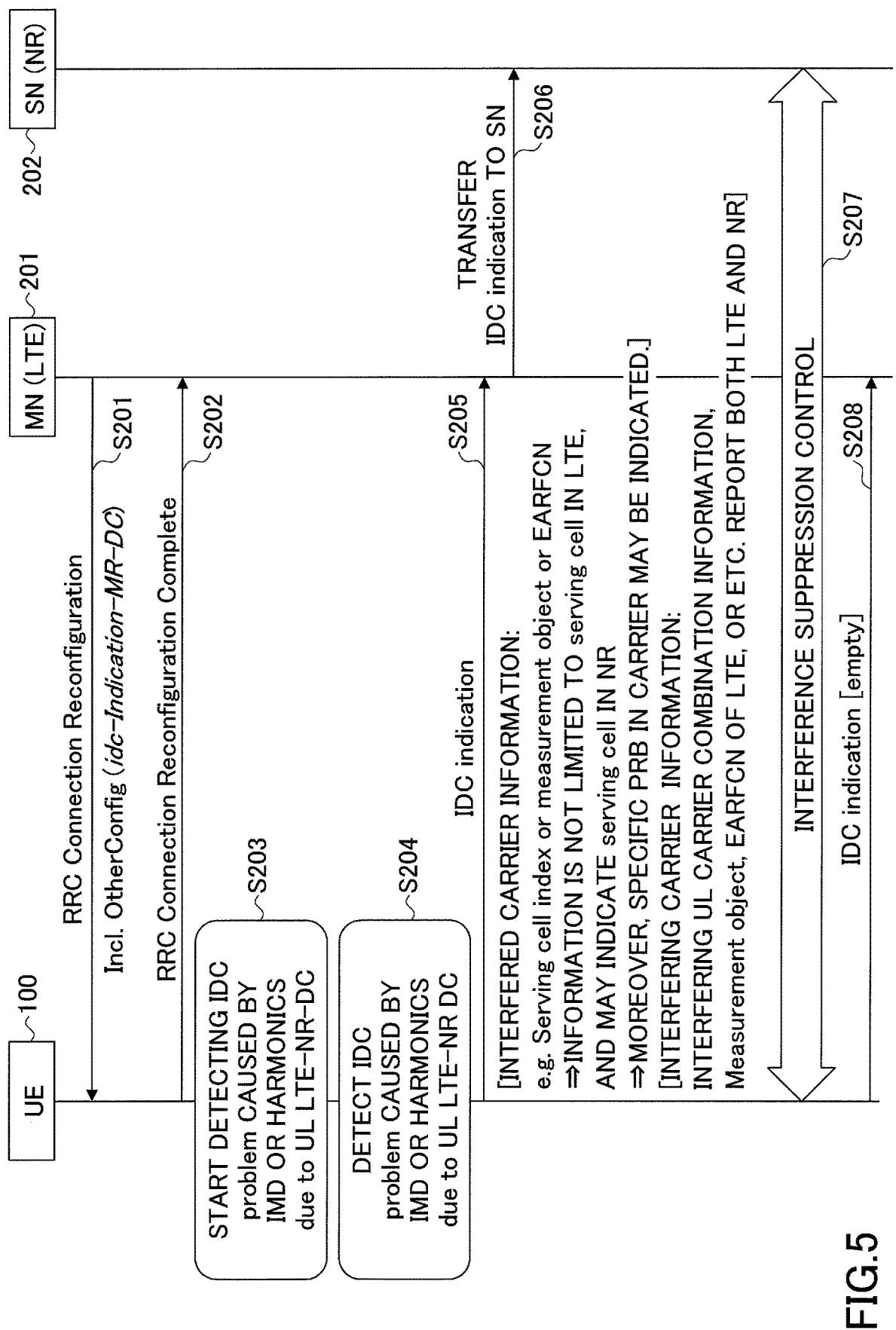
FIG. 5 is a sequence diagram illustrating the IDC indication configuring procedure in the LTE-NR dual connectivity according to the embodiment of the present invention.

Next, with reference to FIG. 4 and FIG. 5, an interference notification configuring procedure in the LTE-NR dual connectivity according to one embodiment of the present invention is described. In the present embodiment, the master base station 201 configures the user equipment 100 to report the device-internal interference of both an LTE component carrier and a NR component carrier in the LTE-NR dual connectivity. The user equipment 100 detects interference for both the LTE component carrier and the NR component carrier, and the sending/receiving part 120 sends the interference notification (InDeviceCoexIndication (IDC) in the illustrated example) including the interfered carrier information and/or the interfering carrier information to the master base station 201.

FIG. 4 is a schematic diagram illustrating the IDC indication configuring procedure in the LTE-NR dual connectivity according to one embodiment of the present invention. The IDC indication configuring procedure may be started in response to, for example, setting the LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 4, in step S101, the master base station 201 configures the user equipment 100 to detect the device-internal interference for both the LTE component carrier and the NR component carrier and to report the interference notification indicating the detected interfered carrier and/or interfering carrier.

In step S102, upon detecting device-internal interference, the user equipment 100 sends an interference notification indicating the detected interfered carrier and/or interfering carrier to the master base station 201. For example, the user equipment 100 may report the serving cell index of the interfered carrier and a measurement object of the interfering carrier to the master base station 201 as the interfering carrier information and the interfered carrier information, respectively. As described above, in a case in which the master base station 201 holds in advance association information indicating a pair of a combination of uplink component carriers and a downlink component carrier causing the device-internal interference due to the combination, the user equipment 100 may send only the interfering carrier information to the master base station 201.

In step S103, the master base station 201 executes appropriate interference suppression control based on the received interference notification, transfers the interference information received from the user equipment 100 to the secondary base station 202, and indicates the secondary base station 202 to execute appropriate interference suppression control.

FIG. 5 is a sequence diagram illustrating the IDC indication configuring procedure in the LTE-NR dual connectivity according to the embodiment of the present invention. For example, the IDC indication configuring procedure may be started in response to setting the LTE-NR dual connectivity. In the illustrated embodiment, it is assumed that the master base station (MN) 201 belongs to the LTE system and the secondary base station (SN) 202 belongs to the NR system. However, in other embodiments, the present invention is not limited thereto, and the master base station 201 may belong to the NR system and the secondary base station 202 may belong to the LTE system.

As illustrated in FIG. 5, in step S201, the master base station (MN) 201 sends the RRC Connection Reconfiguration to the user equipment 100, and configures the user equipment 100 to report the interference notifications indicating an interfered carrier and/or an interfering carrier due to the device-internal interference (OtherConfig (idc-Indication-MR-DC)).

In step S202, the user equipment 100 sends an RRC Connection Reconfiguration Complete indicating completion of the setting to the master base station 201.

In step S203, the user equipment 100 starts detection of the device-internal interference due to the combination of the uplink component carriers.

In step S204, the user equipment 100 detects the device-internal interference due to the combination of the uplink component carriers.

In step S205, the user equipment 100 sends an interference notification including interfered carrier information (for example, a serving cell index, a measurement object, EARFCN, or the like) indicating the interfered carrier to the master base station 201. In this embodiment, in which the master base station 201 belongs to the LTE system, the user equipment 100 reports not only LTE component carriers, which has received the interference, but also an NR component carrier to the master base station 201. In addition, the user equipment 100 may further include interfering carrier information (for example, the serving cell index indicating a combination of interfering uplink component carriers, the measurement object, EARFCN, or the like.) indicating the interfering carrier in the interference notification. Similar to the interfering carrier information, the user equipment 100 reports not only an LTE component carrier, which gives the interference, but also NR component carriers to the master base station 201.

In step S206, the master base station 201 executes appropriate interference suppression control based on the received interference notification, transfers the interference information received from the user equipment 100 to the secondary base station 202, and instructs the secondary base station 202 to execute appropriate interference suppression control.

In step S207, the master base station 201 and the secondary base station 202 execute appropriate interference suppression control for the user equipment 100.

Upon detecting resolution of the device-internal interference in step S208, the user equipment 100 reports that the device-internal interference has been eliminated, to the master base station 201 by sending an empty IDC indication.

Figure 6:
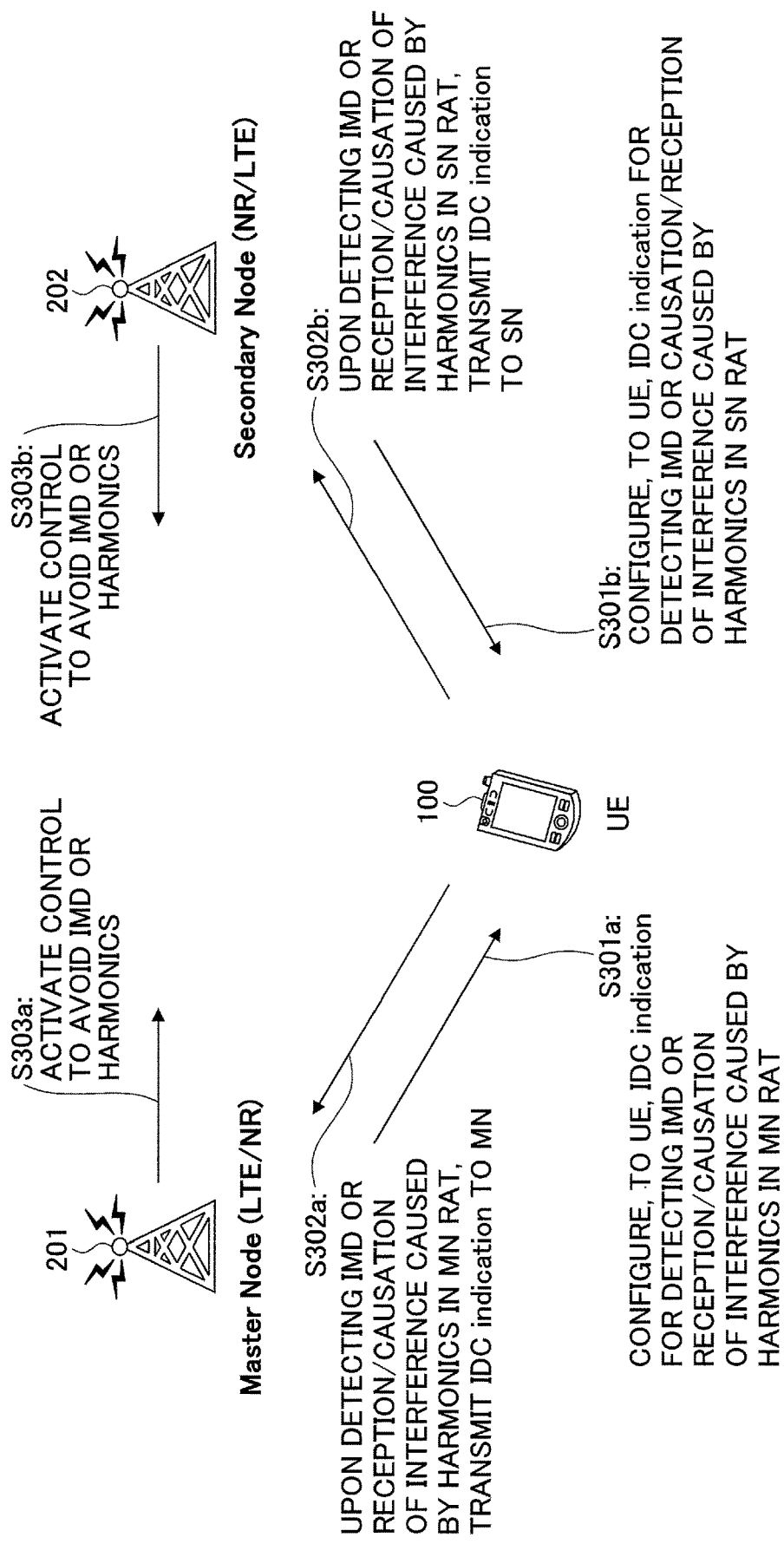
FIG. 6 is a schematic diagram illustrating an IDC indication configuring procedure in the LTE-NR dual connectivity according to one embodiment of the present invention.
Figure 7:
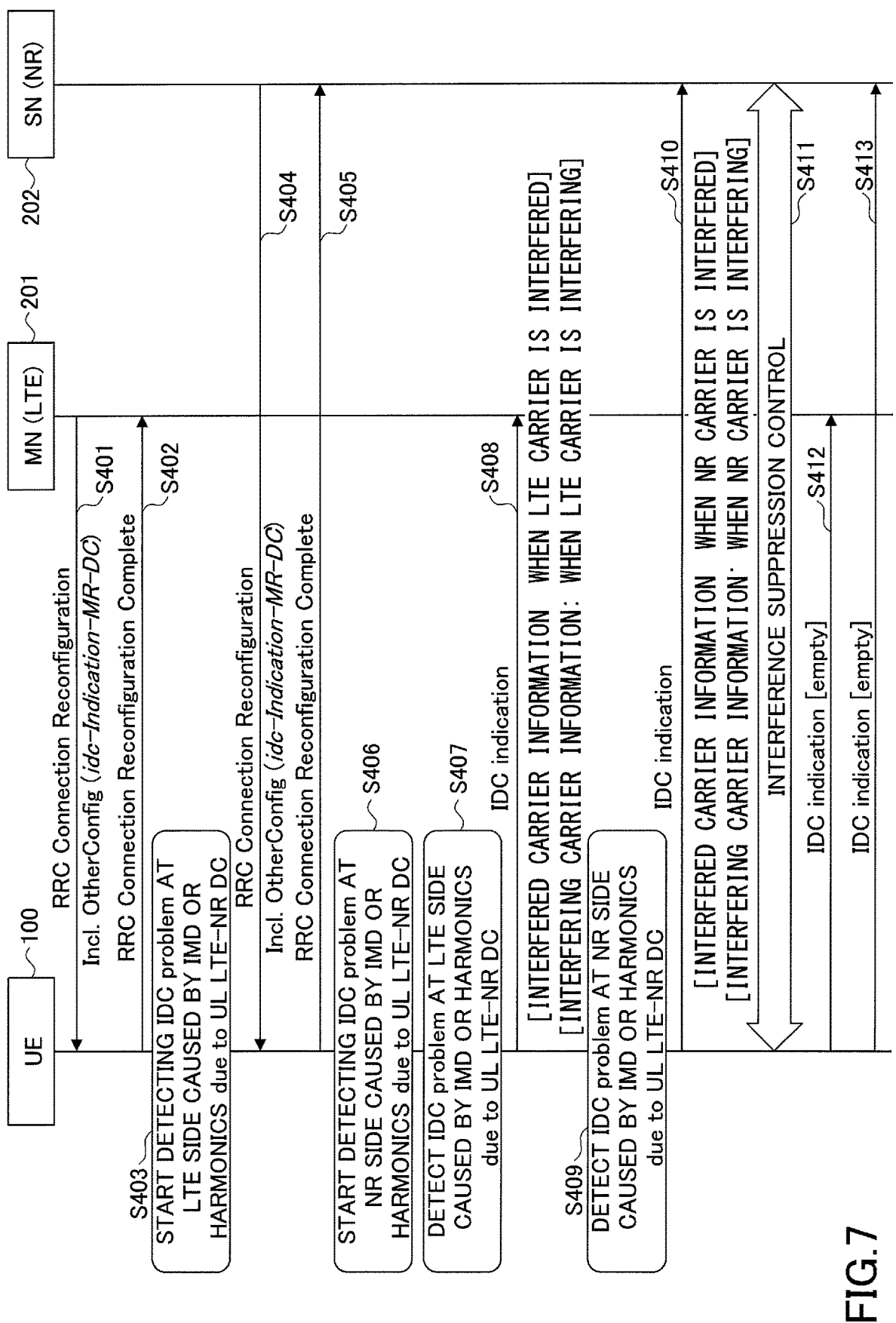
FIG. 7 is a sequence diagram illustrating the IDC indication configuring procedure in the LTE-NR dual connectivity according to the embodiment of the present invention.

Next, with reference to FIG. 6 and FIG. 7, an interference notification configuring procedure in the LTE-NR dual connectivity according to one embodiment of the present invention is described. In the present embodiment, in the LTE-NR dual connectivity, each of the master base station 201 and the secondary base station 202 configures the user equipment 100 to report the device-internal interference, regarding a component carrier of the radio communication system, to which the master base station 201 belongs, and a component carrier of the radio communication system, to which the secondary base station 202 belongs. In this case, the sending/receiving part 120 sends an interference notification indicating the interfered carrier information and/or the interfering carrier information on the radio communication system of the master base station 201 to the master base station 201, and sends an interference notification indicating the interfered carrier information and/or the interfering carrier information on the radio communication system of the secondary base station 202 to the secondary base station 202. For example, in a case in which the master base station 201 belongs to the LTE system and the secondary base station 202 belongs to the NR system, the user equipment 100 sends the interference notification including the interfered carrier information and/or the interfering carrier information on the LTE component carrier to the master base station 201, and sends the interference notification including the interfered carrier information and/or the interfered carrier information on the NR component carrier to the secondary base station 202.

FIG. 6 is a schematic diagram illustrating an IDC indication configuring procedure in the LTE-NR dual connectivity according to one embodiment of the present invention. For example, the IDC indication configuring procedure may be started in response to setting the LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 6, in step S301a, the master base station 201 configures the user equipment 100 to detect the device-internal interference for component carriers of the radio communication system, to which the master base station 201 belongs, and to report the interference notification indicating the detected interfered carrier and/or interfering carrier.

In step S301b, the secondary base station 202 configures the user equipment 100 to detect the device-internal interference for component carriers of the radio communication system, to which the secondary base station 202 belongs, and to report an interference notification indicating the detected interfered carrier and/or interfering carrier.

In step S302a, upon detecting the device-internal interference for a component carrier of the radio communication system, to which the master base station 201 belongs, the user equipment 100 sends the interference notification indicating the detected interfered carrier and/or interfering carrier, to the master base station 201. For example, the user equipment 100 may report the serving cell index of the interfered carrier and the measurement object of the interfering carrier as the interfered carrier information and the interfering carrier information, respectively, to the master base station 201. For example, in a case in which the master base station 201 belongs to the LTE system, the user equipment 100 sends the interference notification indicating the interfered LTE component carrier and/or the interfering LTE component carrier to the master base station 201. As described above, in a case in which the master base station 201 holds in advance the association information indicating a pair of a combination of uplink component carriers and a downlink component carrier causing the device-internal interference due to the combination, the user equipment 100 may send only the interfered carrier information to the master base station 201.

In step S302b, upon detecting the device-internal interference for the component carrier of the radio communication system, to which the secondary base station 202 belongs, the user equipment 100 sends the interference notification indicating the detected interfered carrier and/or interfering carrier to the secondary base station 202. For example, the user equipment 100 may report the serving cell index of the interfered carrier and the measurement object of the interfering carrier to the secondary base station 202 as the interfered carrier information and the interfering carrier information, respectively. For example, in a case in which the secondary base station 202 belongs to the NR system, the user equipment 100 sends the interference notification indicating the interfered NR component carrier and/or the interfering NR component carrier to the secondary base station 202. As described above, when the secondary base station 202 holds in advance the association information indicating a pair of a combination of uplink component carriers and a downlink component carrier causing the device-internal interference due to the combination, the user equipment 100 may send only the interfered carrier information to the secondary base station 202.

In step S303a, the master base station 201 executes appropriate interference suppression control based on the received interference notification.

In step S303b, the secondary base station 202 instructs the secondary base station 202 to execute appropriate interference suppression control based on the received interference information.

FIG. 7 is a sequence diagram illustrating the IDC indication configuring procedure in the LTE-NR dual connectivity according to one embodiment of the present invention. For example, the IDC indication configuring procedure may be started in response to setting the LTE-NR dual connectivity. In the illustrated embodiment, it is assumed that the master base station (MN) 201 belongs to the LTE system and the secondary base station (SN) 202 belongs to the NR system. However, in other embodiments, the present invention is not limited thereto, and the master base station 201 may belong to the NR system and the secondary base station 202 may belong to the LTE system.

As illustrated in FIG. 7, in step S401, the master base station (MN) 201 sends the RRC Connection Reconfiguration to the user equipment 100, and configures the user equipment 100 to report the interference notification indicating the interfered carrier and/or interfering carrier due to the device-internal interference on the LTE component carrier (OtherConfig (idc-Indication-MR-DC)).

In step S402, the user equipment 100 sends the RRC Connection Reconfiguration Complete indicating a completion of the setting to the master base station 201.

In step S403, the user equipment 100 starts detection of the device-internal interference by a combination of uplink component carriers with respect to the LTE system.

In step S404, the secondary base station (SN) 202 sends the RRC Connection Reconfiguration to the user equipment 100, and configures the user equipment 100 to report the interference notification indicating the interfered carrier and/or the interfering carrier by the device-internal interference with respect to the NR component carrier (OtherConfig (idc-Indication-MR-DC)).

In step S405, the user equipment 100 sends the RRC Connection Reconfiguration Complete indicating a completion of the setting to the secondary base station 202.

In step S406, the user equipment 100 starts detection of device-internal interference by a combination of uplink component carriers for the NR system.

In step S407, the user equipment 100 detects device-internal interference due to the combination of the uplink component carriers with respect to the LTE system.

In step S408, the user equipment 100 sends an interference notification including the interfered carrier information indicating the interfered LTE component carrier (for example, the serving cell index, the measurement object, the EARFCN, or the like) to the master base station 201. In addition, the user equipment 100 may further include the interfering carrier information (for example, the serving cell index indicating a combination of interfering uplink LTE component carriers, the measurement object, EARFCN, or the like) indicating the interfering LTE component carrier in the interference notification.

In step S409, the user equipment 100 detects the device-internal interference due to the combination of the uplink component carriers for the NR system.

In step S410, the user equipment 100 sends the interference notification including the interfered carrier information indicating the interfered NR component carrier (for example, the serving cell index, the information specifying the measurement object or the measurement object, or the like) to the secondary base station 202. The user equipment 100 may further include the interfering carrier information indicating an interfering NR component carrier (for example, the serving cell index indicating a combination of interfering uplink NR component carriers, a measurement object or information identifying the measurement object, or the like) in the interference notification.

In step S411, the master base station 201 and the secondary base station 202 execute appropriate interference suppression control based on the received interference notification.

Upon detecting resolution of the device-internal interference in the LTE system in step S412, the user equipment 100 reports to the master base station 201, that the device-internal interference has been eliminated for the LTE component carrier, by sending an empty IDC indication.

Upon detecting the resolution of the device-internal interference in the NR system in step S413, the user equipment 100 reports to the secondary base station 202, that the device-internal interference has been eliminated for the NR component carrier, by sending an empty IDC indication.

Figure 8:
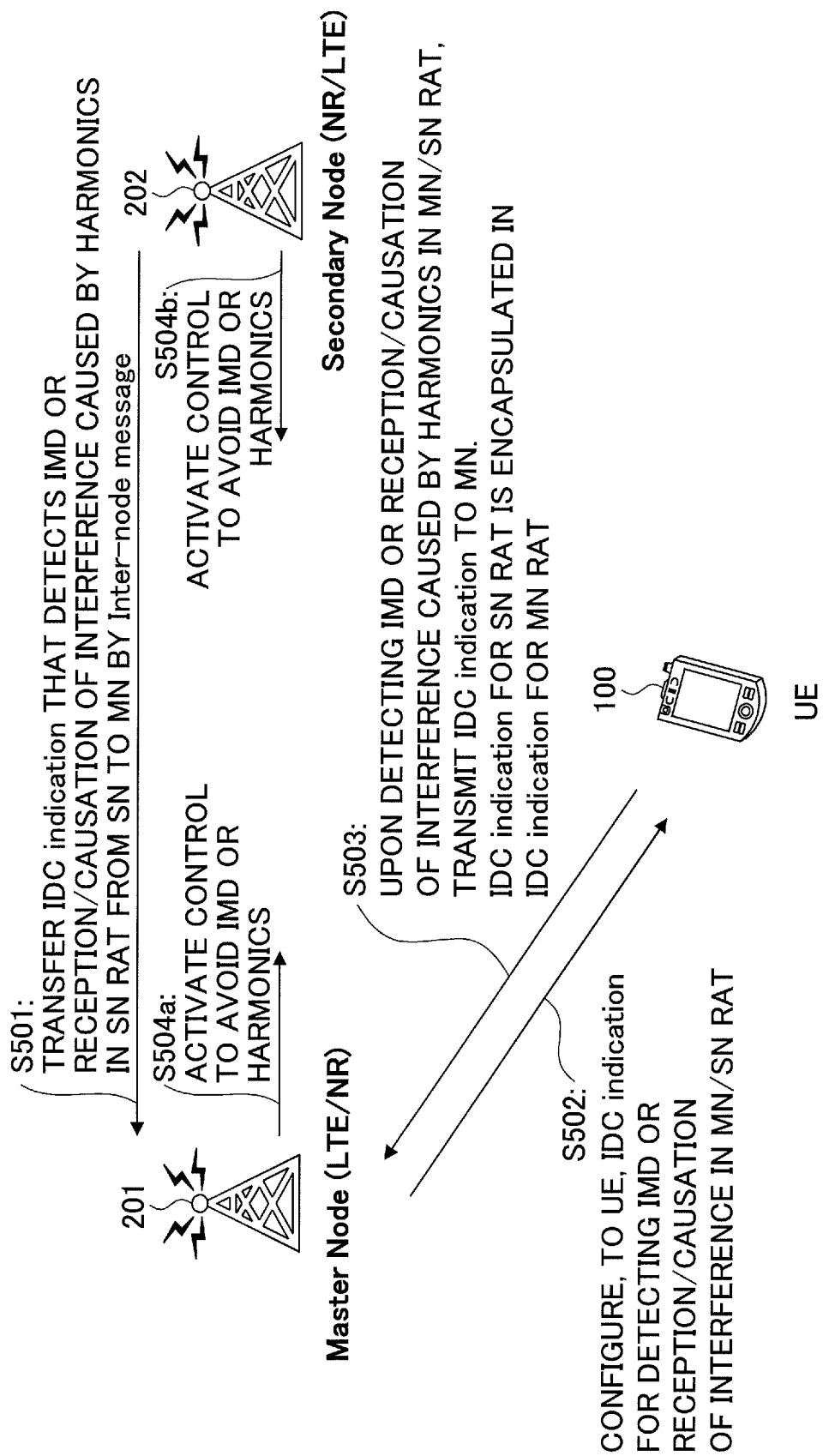
FIG. 8 is a schematic diagram illustrating an IDC indication configuring procedure in the LTE-NR dual connectivity according to one embodiment of the present invention.

Next, referring to FIG. 8, an interference notification configuring procedure in the LTE-NR dual connectivity according to one embodiment of the present invention is described. In the present embodiment, the secondary base station 202 sends to the master base station 201 an interference report configuration (for example, an inter-node message by an RRC or an X2/Xn interface) for causing the user equipment 100 to report device-internal interference of the component carrier of the radio communication system, to which the secondary base station 202 belongs. The master base station 201 includes the received interference report configuration in RRC Connection Reconfiguration, and also configures the user equipment 100 to report the device-internal interference for the component carrier of the radio communication system, to which the master base station 201 belongs, in the RRC Connection Reconfiguration. In this case, the sending/receiving part 120 includes an interference notification indicating the interfered carrier information and/or the interfering carrier information pertaining to the radio communication system of the secondary base station 202 in an interference notification indicating the interfered carrier information and/or the interfering carrier information pertaining to the radio communication system of the master base station 201, and sends the interference notification (IDC) for the master base station 201 and the interference notification (IDC) for the secondary base station 202 to the master base station 201. That is, in the present embodiment, the interference notification for the master base station 201 and the interference notification for the secondary base station 202 are separately generated, and the interference notification for the secondary base station 202 is encapsulated in the interference notification for the master base station 201 and is sent to the secondary base station 202 via the master base station 201.

FIG. 8 is a schematic diagram illustrating an IDC indication configuring procedure in the LTE-NR dual connectivity according to one embodiment of the present invention. For example, the IDC indication configuring procedure may be started in response to setting the LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 8, in step S501, the secondary base station 202 sends an interference report configuration (for example, the inter-node message by the RRC or the X2/Xn interface) for causing the user equipment 100 to report the device-internal interference for the component carrier of the radio communication system, to which the secondary base station 202 belongs, to the master base station 201.

In step S502, the master base station 201 configures the user equipment 100 to detect the device-internal interference for the component carrier of the radio communication system, to which the master base station 201 belongs, and to send an interference notification indicating the detected interfered carrier and/or interfering carrier, and also sends the interference report configuration received from the secondary base station 202 to the user equipment 100.

In step S503, upon detecting device-internal interference for the component carrier of the radio communication system, to which the master base station 201 belongs, the user equipment 100 sends an interference notification for the master base station 201 indicating the detected interfered carrier and/or interfering carrier. For example, in a case in which the master base station 201 belongs to the LTE system, the user equipment 100 generates an interference notification for the master base station 201 indicating the interfered LTE component carrier and/or the interfering LTE component carrier. As described above, when the master base station 201 holds the association information indicating a pair of a combination of uplink component carriers and a downlink component carrier causing the device-internal interference due to the combination in advance, the user equipment 100 may generate the interference notification for the master base station 201 including only the interfered carrier information.

Moreover, upon detecting the device-internal interference for the component carrier of the radio communication system, to which the secondary base station 202 belongs, the user equipment 100 generates an interference notification for the secondary base station 202 indicating the detected interfered carrier and/or interfering carrier. For example, in a case in which the secondary base station 202 belongs to the NR system, the user equipment 100 generates an interference notification for the secondary base station 202 indicating the interfered NR component carrier and/or the interfering NR component carrier. As described above, in a case in which the secondary base station 202 holds the association information indicating a pair of a combination of uplink component carriers and a downlink component carrier causing the device-internal interference by the combination in advance, the user equipment 100 may generate the interference notification for the secondary base station 202 including only the interfered carrier information.

After generating the interference notification for the master base station 201 and the interference notification for the secondary base station 202, the user equipment 100 encapsulates or includes the interference notification for the secondary base station 202 in an interference notification for the master base station 201, and separately sends the interference notification for the generated master base station 201 and the interference notification for the secondary base station 202 to the master base station 201.

In step S504a, the master base station 201 extracts the interference notification for the secondary base station 202 from the received interference notification for the master base station 201, transfers the extracted interference notification for the secondary base station 202 to the secondary base station 202, and also executes appropriate interference suppression control based on the interference notification for the master base station 201.

In step S504b, the secondary base station 202 executes appropriate interference suppression control based on the received interference information for the secondary base station 202.

Figure 9:
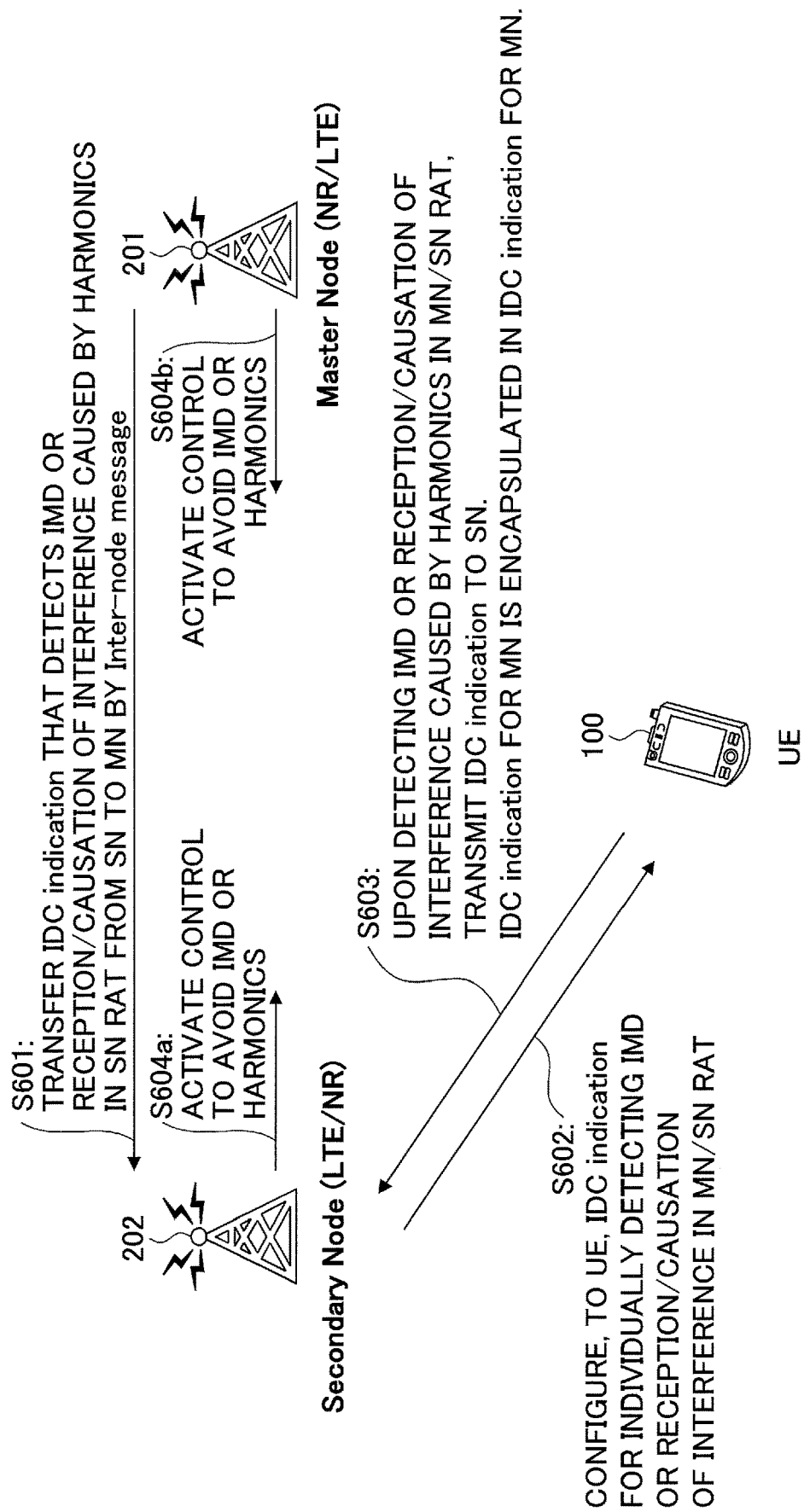
FIG. 9 is a schematic diagram illustrating an IDC indication configuring procedure in the LTE-NR dual connectivity according to one embodiment of the present invention.

Next, with reference to FIG. 9, an interference notification configuring procedure in the LTE-NR dual connectivity according to one embodiment of the present invention is described. In the present embodiment, the master base station 201 sends to the secondary base station 202 an interference report configuration (for example, the inter-node message by the RRC or the X2/Xn interface) for causing the user equipment 100 to report the device-internal interference for the component carrier of the radio communication system, to which the master base station 201 belongs. The secondary base station 202 includes the received interference report configuration in the RRC Connection Reconfiguration, and also configures the user equipment 100 to report the device-internal interference for the component carrier of the radio communication system, to which the secondary base station 202 belongs, in the RRC Connection Reconfiguration. In this case, the sending/receiving part 120 includes an interference notification indicating the interfered carrier information and/or the interfering carrier information concerning the radio communication system of the master base station 201 in an interference notification indicating the interfered carrier information and/or the interfering carrier information concerning the radio communication system of the secondary base station 202, and sends the interference notification (IDC) for the master base station 201 and the interference notification (IDC) for the secondary base station 202 to the secondary base station 202. That is, in the present embodiment, the interference notification for the master base station 201 and the interference notification for the secondary base station 202 are separately generated, and the interference notification for the master base station 201 is encapsulated in the interference notification for the secondary base station 202 and is sent to the master base station 201 via the secondary base station 202.

FIG. 9 is a schematic diagram illustrating an IDC indication configuring procedure in the LTE-NR dual connectivity according to one embodiment of the present invention. For example, the IDC indication configuring procedure may be started in response to setting the LTE-NR dual connectivity. The master base station 201 and the secondary base station 202 may belong to the LTE system and the NR system, respectively, or the master base station 201 and the secondary base station 202 may belong to the NR system and the LTE system, respectively.

As illustrated in FIG. 9, in step S601, the master base station 201 sends an interference report configuration (for example, an inter-node message by the RRC or the X2/Xn interface) for causing the user equipment 100 to report the device-internal interference for the component carrier of the radio communication system, to which the master base station 201 belongs, to the secondary base station 202.

In step S602, the secondary base station 202 configures the user equipment 100 to detect the device-internal interference for the component carriers of the radio communication system, to which the secondary base station 202 belongs, and to report the interference notification, and also sends the interference report configuration received from the master base station 201 to the user equipment 100.

Upon detecting the device-internal interference for the component carrier of the radio communication system, to which the master base station 201 belongs in step S603, the user equipment 100 sends an interference notification for the master base station 201 indicating the detected interfered carrier and/or interfering carrier. For example, in a case in which the master base station 201 belongs to the LTE system, the user equipment 100 generates an interference notification for the master base station 201 indicating the interfered LTE component carrier and/or the interfering LTE component carrier. As described above, when the master base station 201 holds the association information indicating a pair of a combination of uplink component carriers and a downlink component carrier causing the device-internal interference by the combination in advance, the user equipment 100 may generate the interference notification for the master base station 201 including only the interfered carrier information.

Moreover, upon detecting the device-internal interference for the component carrier of the radio communication system, to which the secondary base station 202 belongs, the user equipment 100 generates an interference notification for the secondary base station 202 indicating the detected interfered carrier and/or interfering carrier. For example, in a case in which the secondary base station 202 belongs to the NR system, the user equipment 100 generates an interference notification for the secondary base station 202 indicating the interfered NR component carrier and/or the interfering NR component carrier. As described above, in a case in which the secondary base station 202 holds the association information indicating a pair of a combination of uplink component carriers and a downlink component carriers causing the device-internal interference due to the combination in advance, the user equipment 100 may generate an interference notification for the secondary base station 202 including only the interfered carrier information.

After generating the interference notification for the master base station 201 and the interference notification for the secondary base station 202, the user equipment 100 encapsulates or includes the interference notification for the master base station 201 in the interference notification for the secondary base station 202, and sends the interference notification for the master base station 201 and the interference notification for the secondary base station 202, which are separately generated, to the secondary base station 202.

In step S604a, the secondary base station 202 extracts the interference notification for the master base station 201 from the received interference notification for the secondary base station 202, transfers the extracted interference notification for the master base station 201 to the master base station 201, and also executes appropriate interference suppression control based on the interference notification for the secondary base station 202.

In step S604b, the master base station 201 executes appropriate interference suppression control based on the received interference information for the master base station 201.

Also, in one embodiment, the sending/receiving part 120 may send an interference notification to the base station 201 or 202 providing an interfered carrier or an interfering carrier. Specifically, it is assumed that the interference notification is sent to the base station 201 or 202 that provides the interfered serving carrier. At this time, in a case in which the interfered serving carrier is the LTE component carrier and the base station 201 belongs to the LTE system, the sending/receiving part 120 sends the interference notification to the base station 201. Meanwhile, it is assumed that an interference notification is transmitted to the base station 201 or 202 providing the interfering serving carrier. At this time, in a case in which the giving interference serving carrier is the NR component carrier and the base station 202 belongs to the NR system, the sending/receiving part 120 sends the interference notification to the base station 202.

In a case in which a combination of the interfering uplink component carriers includes both the LTE component carrier and the NR component carrier (such as Case 1 and Case 2 in FIG. 2), the user equipment 100 may send the interference notification to both the master base station 201 and the secondary base station 202 or may send the interference notification to only one of the master base station 201 and the secondary base station 202.

Also, in one embodiment, the sending/receiving part 120 may send the interference notification to the designated base station 201 and/or base station 202. Specifically, the transmission destination of the interference notification may be specified by the base station 201 or 202 in a case of setting the interference report configuration in OtherConfig in the RRC Connection Reconfiguration.

Also, in one embodiment, the interference notification may further include a transmission power reserve or a transmission power value. That is, when the device-internal interference is detected, the user equipment 100 may send a power headroom or an actual transmission power value at a time of detection to the base station 201 and/or the base station 202. Therefore, it is possible for the base station 201 and/or the base station 202 to confirm the transmission power value, which has caused the device-internal interference, and to realize interference suppression by controlling the user equipment 100 to reduce the transmission power.

Also, in one embodiment, the interference notification may further include a radio resource used in the uplink component carrier. That is, upon detecting the device-internal interference, the user equipment 100 may send the radio resource used in the uplink component carrier at a detection time to the base station 201 and/or the base station 202. For example, the radio resource may be a physical resource block (PRB), a physical resource element (PRE), or the like used in each uplink component carrier, which gives interference. Therefore, it is possible for the base station 201 and/or the base station 202 to check a frequency domain of each interfering carrier, which caused the device-internal interference, and to realize the interference suppression by assigning a different frequency region.

Figure 10:
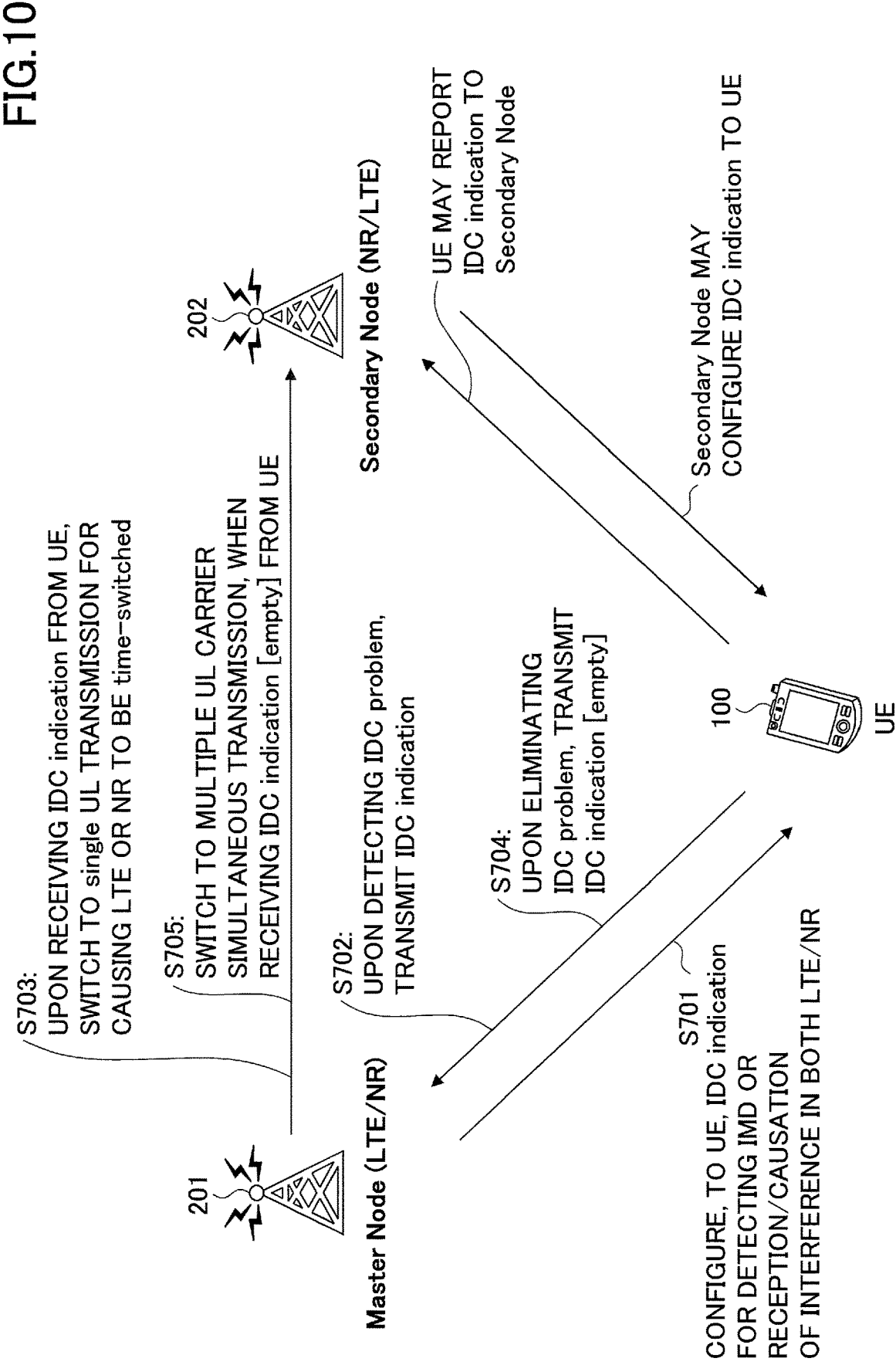
FIG. 10 is a schematic diagram illustrating an IDC indication configuring procedure in the LTE-NR dual connectivity according to one embodiment of the present invention.

FIG. 10 is a schematic diagram illustrating an IDC indication configuring procedure in the LTE-NR dual connectivity according to one embodiment of the present invention. For example, the IDC indication configuring procedure may be started in response to transmitting from the LTE-NR dual connectivity and simultaneously sending multiple UL carriers of LTE and NR from the user equipment 100. The master base station 201 and the secondary base station 202 may belong to the LTE system and the NR system, respectively, or the master base station 201 and the secondary base station 202 may belong to the NR system and the LTE system, respectively.

As illustrated in FIG. 10, in step S701, the master base station 201 detects device-internal interference for both the LTE component carrier and the NR component carrier, and configures the user equipment 100 to report the interference notification indicating the detected interfered carrier and/or interfering carrier.

In step S702, upon detecting the device-internal interference, that is, an IDC problem, the user equipment 100 sends an interference notification indicating the detected interfered carrier and/or interfering carrier, that is, an IDC indication, to the master base station 201. For example, the user equipment 100 may report the serving cell index of the interfered carrier and the measurement object of the interfering carrier to the master base station 201 as the interfered carrier information and the interfering carrier information, respectively. Therefore, in a case in which the master base station 201 holds the association information indicating a pair of a combination of uplink component carriers and a downlink component carrier causing the device-internal interference due to the combination in advance, the user equipment 100 may send only the interfered carrier information to the master base station 201.

In step S703, the master base station 201 executes switching to single UL transmission, which time-switches LTE or NR in order to execute the interference suppression control based on the received IDC indication. The master base station 201 may send to the secondary base station 202 via the inter-node message information necessary for executing the switching, for example, a UL transmission timing pattern indicating respective transmission durations of LTE and NR. Moreover, the master base station 201 may send the UL transmission timing pattern to the user equipment 100 via an RRC message, for example. The UL transmission timing pattern may be semi-statically shared among the master base station 201, the secondary base station 202, and the user equipment 100. According to a procedure of step S703, the user equipment 100, the master base station 201, and the secondary base station 202 start the single UL transmission, which time-switches LTE or NR. That is, the switching part 130 of the user equipment 100 switches between UL transmission modes from the multiple UL carrier simultaneous transmission of LTE and NR UL to single UL transmission, which time-switches LTE or NR.

In step S704, upon detecting that the IDC problem has been eliminated, the user equipment 100 sends an IDC indication [empty] indicating that the IDC problem has been eliminated, to the master base station 201.

Subsequently, in step S705, upon receiving IDC indication [empty], the master base station 201 executes switching to the multiple UL carrier simultaneous transmission of LTE and NR. The master base station 201 sends information necessary for executing the switching to the secondary base station 202 via the inter-node message, and sends the information to the user equipment 100 via an RRC message, for example. According to a procedure of step S705, the user equipment 100, the master base station 201 and the secondary base station 202 start the multiple UL carrier simultaneous transmission of LTE and NR. That is, the switching part 130 of the user equipment 100 switches the UL transmission scheme from the single UL transmission, which time-switches LTE or NR, to the multiple UL carrier simultaneous transmission of LTE and NR.

In steps S701 to S705, operations of the master base station 201 and the secondary base station 202 may be exchangeable. That is, the secondary base station 202 may configure the IDC indication in the user equipment 100 in step S701, or the user equipment 100 may indicate the IDC indication to the secondary base station 202 in step S702 or S704.

By sending the IDC indication to the master base station 201 according to a procedure of step S701 through step S705, the user equipment 100 starts the single UL transmission, which time-switches LTE or NR; thereby, it is possible to suppress the device-internal interference. Further, by sending the IDC indication [empty] to the master base station 201, the user equipment 100 can start the multiple UL carrier simultaneous transmission of LTE and NR, return to dual connectivity, and improve throughput.

Figure 11:
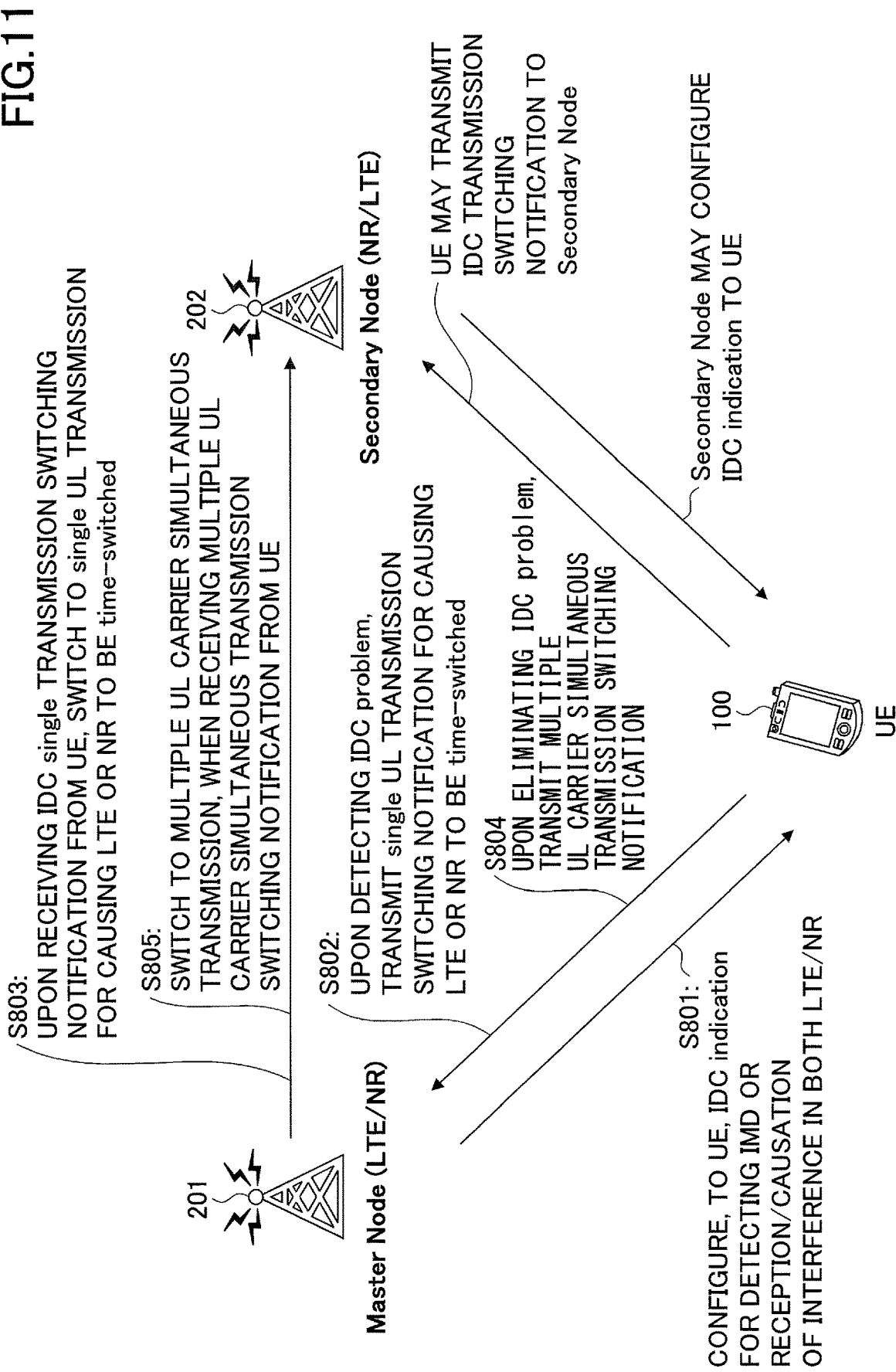
FIG. 11 is a schematic diagram illustrating an IDC indication configuring procedure in the LTE-NR dual connectivity according to one embodiment of the present invention.

FIG. 11 is a schematic diagram illustrating an IDC indication configuring procedure in the LTE-NR dual connectivity according to one embodiment of the present invention. Similar to the IDC indication configuring procedure depicted in FIG. 10, for example, the IDC indication configuring procedure may be started in response to setting the LTE-NR dual connectivity and simultaneously transmitting from the multiple UL carriers of LTE and NR from the user equipment 100. The master base station 201 and the secondary base station 202 may belong to the LTE system and the NR system, respectively, or the master base station 201 and the secondary base station 202 may belong to the NR system and the LTE system, respectively.

As depicted in FIG. 11, in step S801, the master base station 201 configures the user equipment 100 to detect the device-internal interference for both LTE component carrier and NR component carrier and to report the interference notification indicating the detected interfered carrier and/or interfering carrier.

In step S802, upon detecting device-internal interference, that is, the IDC problem, the user equipment 100 sends to the master base station 201 a switching indication to the single UL transmission, which time-switches LTE or NR. The switching indication may be included in the IDC indication, or may not be included in the IDC indication.

In step S803, upon receiving the switching indication to the single UL transmission, which time-switches LTE or NR, the master base station 201 executes switching to the single UL transmission, which time-switches LTE or NR. The master base station 201 may send to the secondary base station 202 via an inter-node message information necessary for executing the switching, for example, a UL transmission timing pattern indicating respective transmission duration of LTE and NR. Moreover, the master base station 201 may send the UL transmission timing pattern to the user equipment 100 via an RRC message, for example. The UL transmission timing pattern may be semi-statically shared among the master base station 201, the secondary base station 202, and the user equipment 100. According to a procedure of step S803, the user equipment 100, the master base station 201 and the secondary base station 202 start the single UL transmission, which time-switches LTE or NR. That is, the switching part 130 of the user equipment 100 switches between UL transmission modes from the multiple UL carrier simultaneous transmission of LTE and NR to the single UL transmission, which time-switches LTE or NR.

In step S804, upon detecting that the IDC problem has been eliminated, the user equipment 100 sends a switching indication for multiple UL carrier simultaneous transmission of LTE and NR, to the master base station 201. The switching indication may be a indication included in the IDC indication or a indication not included in the IDC indication.

Subsequently, in step S805, upon receiving an indication of the switching to the multiple UL carrier simultaneous transmission of LTE and NR, the master base station 201 switches to the multiple UL carrier simultaneous transmission of LTE and NR. The master base station 201 sends information necessary for executing the switching to the secondary base station 202 via an inter-node message, and sends the information to the user equipment 100 via an RRC message, for example. According to a procedure of step S805, the user equipment 100, the master base station 201 and the secondary base station 202 start the multiple UL carrier simultaneous transmission of LTE and NR. That is, the switching part 130 of the user equipment 100 switches UL transmission scheme from the single UL transmission for time-switching LTE or NR to the multiple UL carrier simultaneous transmission of LTE and NR.

In steps S801 to S805, operations of the master base station 201 and the secondary base station 202 may be exchangeable. That is, the secondary base station 202 may set the IDC indication in the user equipment 100 in step S801, or in step S802 or step S804, the user equipment 100 may send a transmission switching indication to the secondary base station 202.

According to a procedure of step S801 to step S805, the user equipment 100 transmits the switching indication to the single UL transmission for time-switching LTE or NR to the master base station 201, so that the single UL transmission for time-switching LTE or NR is started, and it is possible to suppress the device-internal interference. In addition, the user equipment 100 sends to the master base station 201 the switching to the multiple UL carrier simultaneous transmission of LTE and NR; thereby, the multiple UL carrier simultaneous transmission of LTE and NR is started, and the dual connectivity is restored, and the throughput can be improved.

Next, examples of a signaling according to embodiments of the present invention are described with reference to FIG. 12 to FIG. 17.

The user equipment 100 may send an interference notification to the base station 201 or 202 belonging to the LTE system by "InDeviceCoexIndication message" as illustrated in FIG. 12. In this case, the information element "affectedCarrierFreqComList" indicates the interfering carrier information, and an information element "victimCarrierList" indicates the interfered carrier information. Moreover, an information element "powerHeadroom" indicates the transmission power reserve or the transmission power value.

The base station 201 or 202 belonging to the LTE system may set the information element "idc-Indication-MR-DC" within "OtherConfig" as depicted in FIG. 13; thereby, the user equipment 100 is set to detect the device-internal interference and to report an interference notification.

Meanwhile, the user equipment 100 may send the interference notification to the base station 201 or 202 belonging to the NR system by "InDeviceCoexIndication message" as depicted in FIG. 14. In this case, an information element "affectedCarrierFreqComListNR" indicates the interfering carrier information, and an information element "victimCarrierListNR" indicates the interfered carrier information. Moreover, the information element "powerHeadroom" indicates the transmission power reserve or the transmission power value.

The base station 201 or 202 belonging to the NR system may set an information element "idc-Indication-MR-DC" within "OtherConfig" as depicted in FIG. 15; thereby, the user equipment 100 is set to detect the device-internal interference and to report the interference notification.

Also, with respect to the embodiments depicted in FIG. 8 and FIG. 9, user equipment 100 may send the interference notification to the base station 201 or 202 belonging to the LTE system by "InDeviceCoexIndication message" as illustrated in FIG. 16. In this case, the information element "affectedCarrierFreqComList" indicates the interfering carrier information, and the information element "victimCarrierList" indicates the interfered carrier information. Moreover, the information element "powerHeadroom" indicates the transmission power reserve or the transmission power value. Furthermore, an information element "nr-IndeviceCoexInd-Container" indicates the interfered carrier information and/or the interfering carrier information of the NR component carrier to be transferred to the base station 202 or 201 belonging to the NR system.

In the meanwhile, the user equipment 100 may send an interference notification to the base station 201 or 202 belonging to the NR system by "InDeviceCoexIndication message" as depicted in FIG. 17. In this case, the information element "affectedCarrierFreqComListNR" indicates the interfering carrier information, and the information element "victimCarrierListNR" indicates the interfered carrier information. Moreover, the information element "powerHeadroom" indicates the transmission power reserve or the transmission power value. Furthermore, an information element "eutra-IndeviceCoexInd-Container" indicates the interfered carrier information and/or the interfering carrier information of the NR component carrier to be transferred to the base station 202 or 201 belonging to the LTE system.

The block diagrams used in the description of the above embodiments correspond to blocks of functional units. These functional blocks (component parts) are realized by any combination of hardware and/or software. Means for realizing each functional block is not particularly limited. That is, each functional block may be realized by one device physically and/or logically combined, or may be realized by a plurality of these devices directly and/or indirectly (for example, wired and/or wireless) connecting two or more devices physically and/or logically separated.

Figure 18:
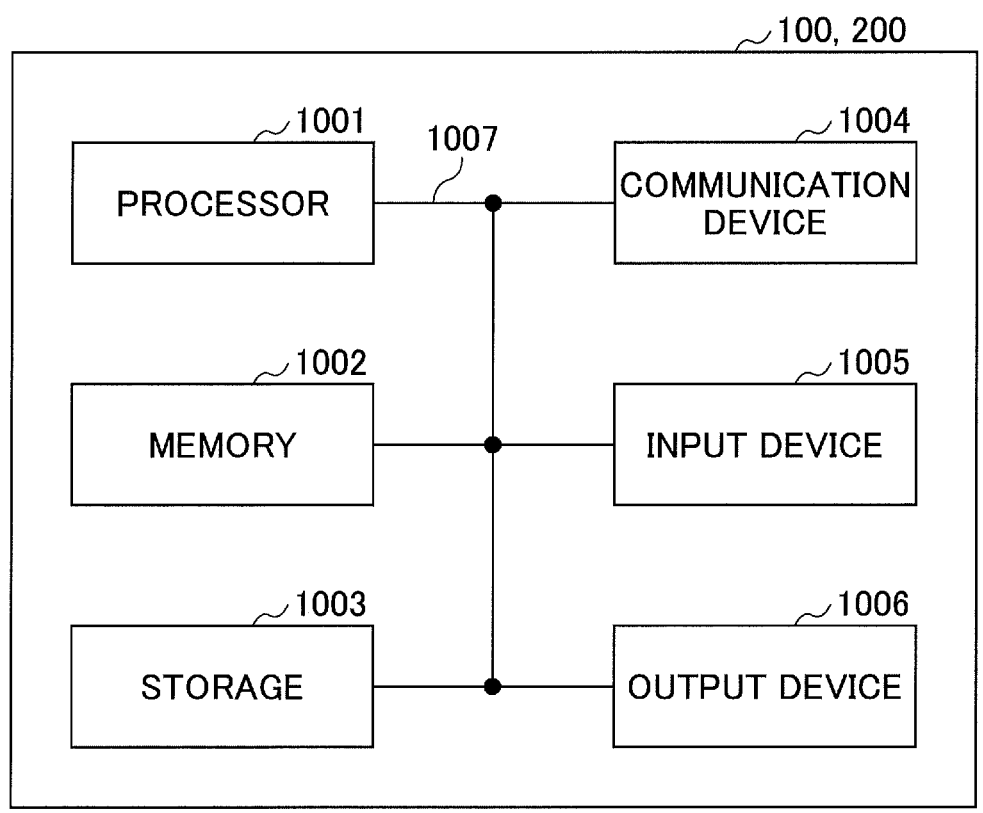
FIG. 18 is a block diagram illustrating hardware configurations of user equipment and a base station according to one embodiment of the present invention.

For example, the user equipment 100 and the base station 200 in one embodiment of the present invention may function as a computer that performs a process of the radio communication method of the present invention. FIG. 18 is a block diagram illustrating hardware configurations of the user equipment 100 and the base station 200 according to one embodiment of the present invention. The above-described user equipment 100 and base station 200 may be physically formed as a computer apparatus including a processor 1001, a memory 1002, a storage 1003, a communication device 1004, an input device 1005, an output device 1006, a bus 1007, and the like.

In the following description, the term "apparatus" may be read as a circuit, a device, a unit, or the like. A hardware configuration of the user equipment 100 and the base station 200 may be formed to include one or more of the apparatuses depicted in the drawings or may be formed not to include some apparatuses.

Each function of the user equipment 100 and the base station 200 causes the processor 1001 to perform computation by causing predetermined software (programs) to be loaded on the hardware such as the processor 1001 and the memory 1002, and is realized by controlling communication by the communication device 1004 and reading and/or writing data in the memory 1002 and the storage 1003.

The processor 1001, for example, operates the operating system to control the entire computer. The processor 1001 may be formed by a central processing unit (CPU) including an interface with a peripheral device, a control device, an arithmetic device, a register and the like. For example, each component described above may be realized by the processor 1001.

Moreover, the processor 1001 reads a program (program code), a software module and data from the storage 1003 and/or the communication device 1004 to the memory 1002, and executes various processes according to these. As the program, a program for causing a computer to execute at least part of the operation described in the above embodiment is used. For example, the processing by each component of the user equipment 100 and the base station 200 may be stored in the memory 1002, may be realized by a control program operating on the processor 100, and also, other functional blocks may be implemented similarly. It has been described that the above-described various processes are executed by one processor 1001; however, it may be executed simultaneously or sequentially by two or more processors 1001. The processor 1001 may be implemented with one or more chips. Alternatively, the program may be transmitted from a network via an electric communication line.

For example, the memory 1002 is a computer readable recording medium and is formed with at least one of a ROM (Read Only Memory), an EPROM (Erasable Programmable ROM), an EEPROM (Electrically Erasable Programmable ROM), a RAM (Random Access Memory). The memory 1002 may be referred to as a register, a cache, a main memory (main memory device), or the like. The memory 1002 can store executable programs (program codes), software modules, and the like for implementing the radio communication method according to the embodiments of the present invention.

The storage 1003 is a computer-readable recording medium, and may be formed by at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, or a key drive), a floppy (registered trademark) disk, a magnetic strip, or the like, for example. The storage 1003 may be referred to as an auxiliary storage device. For example, the storage medium described above may be a database including the memory 1002 and/or the storage 1003, a server, or other appropriate medium.

The communication device 1004 is hardware (sending/receiving device) for performing communication between computers via a wired and/or wireless network, and is also referred to as a network device, a network controller, a network card, a communication module, or the like, for example. For instance, each component described above may be realized by the communication device 1004.

The input device 1005 is an input device (for example, a keyboard, a mouse, a microphone, a switch, a button, a sensor, or the like), which accepts an input from an outside. The output device 1006 is an output device (for example, a display, a speaker, an LED lamp, or the like), which performs an output to the outside. However, the input device 1005 and the output device 1006 may be integrated together (for example, a touch panel).

Moreover, each of devices such as the processor 1001 and the memory 1002 is connected by the bus 1007 for communicating information. The bus 1007 may be formed by a single bus or may be formed by different buses respectively for the devices.

Moreover, the user equipment 100 and the base station 200 may be formed to include hardware such as a microprocessor, a digital signal processor (DSP: Digital Signal Processor), an ASIC (Application Specific Integrated Circuit), a PLD (Programmable Logic Device), or a FPGA (Field Programmable Gate Array), and a part of or the entire each functional block may be realized by the hardware. For example, the processor 1001 may be implemented with at least one of these hardware components.

As described above, according to embodiments of the present invention, provided is user equipment for communicating with a first base station apparatus included in a first radio communication system and a second base station apparatus included in a second radio communication system, the user equipment including: an interference notification generating part configured to generate an interference notification including information indicating that device-internal interference at the user equipment is detected or that resolution of device-internal interference is detected; a sending/receiving part configured to send the interference notification to the first base station apparatus or the second base station apparatus, and receive a response to the interference notification from the first base station apparatus or the second base station apparatus; and a switching part configured to switch between uplink transmission schemes based on the response to the interference notification.

With the above configuration, the user equipment can suppress interference due to intermodulation distortion in a dual connectivity among a plurality of radio communication systems using different RATs by switching between uplink transmission schemes.

The uplink transmission scheme may include a first transmission scheme that executes, in parallel, transmission toward the first base station apparatus and transmission toward the second base station apparatus; and a second transmission scheme that alternates between transmission toward the first base station apparatus and transmission toward the second base station apparatus in time-switched manner, wherein the switching between the uplink transmission schemes is to switch between the first transmission scheme and the second transmission scheme.

The switching between the uplink transmission schemes may be from the first transmission scheme to the second transmission scheme, when information indicating that device-internal interference in the user equipment is detected is included in the interference notification, and the switching between the uplink transmission scheme is from the second transmission scheme to the first transmission scheme, when information indicating that resolution of device-internal interference in the user equipment is detected is included in the interference notification.

The interference notification may include information indicating to switch between the uplink transmission schemes. By this configuration, the user equipment can report to the base station apparatus to switch between the uplink transmission schemes based on the detection situation of the device-internal interference.

The response to the interference notification includes a transmission timing pattern indicating a timing of switching between transmission toward the first base station apparatus and transmission toward the second base station in the time-switched manner.

The embodiments provide a base station apparatus that is included in a first radio communication system and is connected to user equipment communicating with a second base station apparatus included in a second radio communication system, the base station apparatus including a communication part configured to receive an interference notification from the user equipment; and a generating part configured to generate a message concerning a switching between uplink transmission schemes based on the interference notification, wherein the message is sent to the user equipment and the second base station apparatus.

By the above configuration, the base station apparatus can suppress the interference due to the intermodulation distortion in the dual connectivity among a plurality of radio communication systems using different RATs by switching the uplink transmission scheme.

While the embodiment of the present invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the present invention, and features described in two or more items may be used in a combination, and a feature described in a certain item may be applied to a feature described in another item (unless contradiction occurs). The boundaries of the functional units or the processing units in the functional block diagram do not necessarily correspond to boundaries of physical components. The operations of a plurality of functional units may be physically performed by a single component. Alternatively, the operations of the single functional unit may be physically performed by a plurality of components. The order of the processes in each of the processing procedures described in the embodiments may be re-arranged unless contradiction occurs. For convenience of explanation of processing, the user equipment 100 and the base station 200 have been explained using functional block diagrams. However, these apparatuses may be implemented by hardware, software, or a combination thereof. The software that operates by a processor included in the base station 200 according to the embodiments of the present invention and the software that operates by a processor included in the user equipment 100 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, and other appropriate storage media.

Moreover, a indication of information is not limited to the aspects/embodiments described in the present specification, and may be performed in other methods. For example, the indication of information may be performed by physical layer signaling (for example, DCI (Downlink Control Information), UCI (Uplink Control Information)), upper layer signaling (for example, RRC signaling, MAC signaling, broadcast information (MIB (Master Information Block), SIB (System Information Block))), other signals, or combinations thereof. Further, an RRC message may be referred to as RRC signaling; for example, an RRC message may be an RRC connection setup message, an RRC connection reconfiguration message, or the like.

The aspects/embodiments described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

As long as there is no inconsistency, the order of processes, sequences, flowcharts, and the like of each aspect/embodiment described in this specification may be exchanged. For example, for the methods described herein, elements of the various steps are presented in an exemplary order and are not limited to the specific order presented.

In the present specification, the specific operation, which is performed by the base station 200, may be performed by an upper node in some cases. In a network consisting of one or more network nodes having a base station, it is apparent that various operations performed for communication with a terminal can be performed by other network nodes (for example, MME or S-GW may be considered, but it is not limited thereto) than the base station and/or the base station. In the above example, a case of one network node other than a base station was described, but a combination of a plurality of other network nodes (for example, MME and S-GW) may be used.

Information and the like can be output from the upper layer (or lower layer) to the lower layer (or upper layer). It may be input/output via a plurality of network nodes.

The input/output information and the like may be stored in a specific place (for example, a memory) or managed in a management table.

Information or the like to be input/output can be overwritten, updated, or additionally written. The outputted information and the like may be deleted.

The determination may be made by a value (0 or 1) represented by 1 bit, by a boolean value (Boolean: true or false), or by comparison of numerical values (for example, comparison with predetermined values).

Each aspect/example described in the present specification may be used singly or in combination, or may be switched in accordance with an execution. Moreover, a notification of predetermined information (for example, a notification of "being X") is not limited to being performed explicitly, but may be performed implicitly (for example, not notifying the predetermined information).

Although the present invention has been described in detail above, it is obvious to those skilled in the art that the present invention is not limited to the embodiments described herein. The present invention may be implemented as modifications and modifications without departing from the spirit and scope of the present invention as defined by the scope of the claims. Therefore, the description of the present specification is for the purpose of illustration and does not have any restrictive meaning to the present invention.

Software should be interpreted broadly to mean functions, an instruction, an instruction set, a code, a code segment, a program code, a program, a subprogram, a software module, an application, a software application, a software package, a routine, a subroutine, an object, an executable file, or the like, regardless of whether it is called software, firmware, middleware, microcode, hardware description language, or other name.

In addition, software, instructions, and the like may be transmitted and received via a transmission medium. For example, in a case in which software is sent from a website, a server, or other remote sources using wired technologies such as a coaxial cable, a fiber optic cable, a twisted pair, a digital subscriber line (DSL), and the like, and/or wireless technologies such as infrared, radio, microwave, and the like, these wired and/or wireless technologies are included within the definition of the transmission medium.

The information, the signals, and the like described herein may be represented using any of a variety of different technologies. For example, data, instructions, commands, information, signals, bits, symbols, chips, and the like, which may be mentioned throughout the above description, may be represented by voltages, currents, electromagnetic waves, magnetic or magnetic particles, optical fields or photons, or any combination thereof.

It should be noted that the terms described in this specification and/or the terms necessary for understanding the present specification may be replaced by terms having the same or similar meanings. For example, a channel and/or a symbol may be a signal. Also, the signal may be a message.

Moreover, the component carrier (CC) may be referred to as a carrier frequency, a cell, or the like.

Terms "system" and "network" as used herein are used interchangeably.

Moreover, the information, parameters, and the like described in the present specification may be represented by absolute values, may be expressed as relative values from predetermined values, or may be represented by other corresponding information. For example, a radio resource may be indicated by an index.

The name used for the above parameters is not limited in any viewpoint. Furthermore, mathematical expressions and the like using these parameters may be different from those explicitly disclosed in this specification. As various channels (for example, PUCCH, PDCCH, or the like) and information elements (for example, TPC, or the like) may be identified by any suitable name, various names assigned to these various channels and information elements are not limited in any viewpoint.

A base station can accommodate one or more (for example, three) cells (also called sectors). In a case in which the base station accommodates a plurality of cells, the entire coverage area of the base station may be divided into a plurality of smaller areas and each smaller area may also provide communication services by the base station subsystem (for example, small indoor base station RRH: Remote Radio Head). The term "cell" or "sector" refers to a part or all of the coverage area of a base station and/or base station subsystem, which performs communication service in this coverage. Moreover, the terms "base station", "eNB", "cell" and "sector" may be used interchangeably herein. The base station may also be referred to as a fixed station, Node B, eNodeB (eNB), an access point, a femtocell, a small cell, or the like terms.

A mobile station may also be referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

As used herein, the term "determining" may encompass a wide variety of actions. For example, the term "determining" may be regarded as calculating, computing, processing, deriving, investigating, looking up (for example, looking up in a table, a database, or another data structure), ascertaining, and the like. Moreover, the term "determining" may be regarded as receiving (for example, receiving information), transmitting (for example, transmitting information), inputting, outputting, accessing (for example, accessing data in a memory), and the like. Also, the term "determining" may be regarded as resolving, selecting, choosing, establishing, comparing, and the like. That is, the term "determining" may be regarded as a certain type of an action related to the determining.

The term "connected", "coupled", or any variations thereof, means any direct or indirect connection or coupling between two or more elements, and may include presence of one or more intermediate elements between two elements "connected" or "coupled" to each other. The coupling or connection between the elements may be physical, logical, or a combination thereof. As used in the specification, two elements may be considered to be "connected" or "coupled" to each other by using one or more wires, cables and printed electrical connections, as well as with respect to any number of non-limiting and non-comprehensive examples, by using electromagnetic energy such as electromagnetic energy having wavelengths in the radio frequency, microwave and light (both visible and invisible) regions, whereby the two elements may be considered "connected" or "coupled" to one another.

A reference signal may be abbreviated as RS (Reference Signal), and may be called a pilot (Pilot) according to applicable standards.

As used in this specification, the phrase "based on" does not mean, unless otherwise noted, "based on only". In other words, the phrase "based on" means both "based on only" and "based on at least".

A reference to an element using a designation such as "first", "second", or the like as used in this specification generally does not limit an amount or an order of those elements. These designations may be used in this specification as a convenient way to distinguish between two or more elements. Thus, the reference to the first and second elements does not imply that only two elements can be employed, or that the first element needs to precede the second element in some way.

"Means" in the configuration of each of the above devices may be replaced with "part", "circuit", "device", and the like.

As long as "include", "including", and variations thereof are used in this specification or claims, these terms are intended to be inclusive, similar to a term "comprising". Furthermore, the term "or" used in this specification or claims does not mean exclusive OR.

In the whole of the present disclosure, for example, if articles are added by translation, such as "a", "an", and "the" in English, these articles may include more than one, unless clearly indicated to the contrary by context.

A radio frame may be formed of one or more frames in a time domain. In the time domain, each of one or more frames may be referred to as a sub-frame. The sub-frame may be further formed by one or more slots in the time domain. The slot may be further formed by one or more symbols (an OFDM symbol, an SC-FDMA symbol, and the like) in the time domain. Any one of the radio frame, the subframe, the slot, and the symbol represents a time unit for transmitting a signal. The radio frame, the sub-frame, the slot, and the symbol may have different designations, respectively. For example, in the LTE system, the base station performs scheduling to allocate radio resources (such as a frequency bandwidth and a transmission power, which can be used with respect to each mobile station) to each mobile station. A minimum time unit of scheduling may be called TTI (Transmission Time Interval). For example, one sub-frame may be referred to as TTI, or a plurality of consecutive sub-frames may be referred to as TTI, or one slot may be referred to as TTI. A resource block (RB) is a resource allocation unit in the time domain and the frequency domain, and may include one or a plurality of consecutive subcarriers in the frequency domain. Also, in the time domain of the resource block, one or a plurality of symbols may be included and may indicate a length of one slot, one sub-frame, or one TTI. One TTI and one sub-frame may be formed by one or more resource blocks. The above-described structure of the radio frame is merely an example, and a number of sub-frames included in the radio frame, a number of slots included in the sub-frame, a number of symbols and resource blocks included in the slot, and a number of subcarriers included in the resource block can be variously changed.

The embodiments of the invention are described above in detail; however, the invention is not limited to the specific embodiments, and various modifications and changes may be made within a range of the gist of the invention described in the claims.

This application is based upon and claims the benefit of priority of Japanese Patent Application No. 2017-156012 filed on Aug. 10, 2017, and the entire contents of Japanese Patent Application No. 2017-156012 are incorporated herein by reference.

LIST OF REFERENCE SYMBOLS

100 user equipment
110 interference notification generating part
120 sending/receiving part
130 switching part
201, 202 base station

The invention claimed is:
1. A terminal comprising:
a processor that generates an interference notification which includes information indicating that a first device-internal interference on a downlink interfered carrier used for communication with a first base station is detected, a second device-internal interference on a downlink interfered carrier used for communication with a second base station is detected, a resolution of the first device-internal interference is detected, or a resolution of the second device-internal interference is detected; and
a transmitter that transmits the interference notification to the first base station,
wherein the information includes information indicating a measurement object indicating an interfered carrier in the communication with the first base station and a frequency domain for downlink, and information identifying a frequency corresponding to an interfered carrier in the communication with the second base station.
2. The terminal as claimed in claim 1, further comprising:
a receiver that receives a response to the interference notification,
wherein the processor switches an uplink transmission procedure based on the response to the interference notification,
wherein the uplink transmission procedure includes a first transmission procedure that performs transmission to the first base station and the second base station in parallel and a second transmission procedure that performs switching between transmission to the first base station and transmission to the second base station by time division, and
wherein the processor switches between the first transmission procedure and the second transmission procedure.
3. The terminal as claimed in claim 2, wherein the response to the interference notification includes switching timing between the first transmission procedure and the second transmission procedure by time division.
4. A first base station comprising:
a receiver that receives, from a terminal, an interference notification which includes information indicating that a first device-internal interference on a downlink interfered carrier used for communication with the first base station is detected, a second device-internal interference on a downlink interfered carrier used for communication with a second base station is detected, a resolution of the first device-internal interference is detected, or a resolution of the second device-internal interference is detected; and a processor that executes an interference suppression control based on the interference notification, wherein the information includes information indicating a measurement object indicating an interfered carrier in the communication with the first base station and a frequency domain for downlink, and information identifying a frequency corresponding to an interfered carrier in the communication with the second base station.

* * * * *